United States Patent
Ikeda

(10) Patent No.: US 12,077,242 B2
(45) Date of Patent: Sep. 3, 2024

(54) SHOCK ABSORBER AND SADDLE-TYPE VEHICLE

(71) Applicant: Hitachi Astemo, Ltd., Hitachinaka (JP)

(72) Inventor: Daisuke Ikeda, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 351 days.

(21) Appl. No.: 17/546,456

(22) Filed: Dec. 9, 2021

(65) Prior Publication Data

US 2022/0097795 A1    Mar. 31, 2022

Related U.S. Application Data

(63) Continuation of application No. PCT/JP2019/029995, filed on Jul. 31, 2019.

(51) Int. Cl.
*B62K 25/20* (2006.01)
*F16F 9/348* (2006.01)
*F16F 9/44* (2006.01)
*F16F 9/54* (2006.01)

(52) U.S. Cl.
CPC .............. *B62K 25/20* (2013.01); *F16F 9/348* (2013.01); *F16F 9/44* (2013.01); *F16F 9/54* (2013.01)

(58) Field of Classification Search
CPC ..... B62K 25/20; F16F 9/44; F16F 9/54; F16F 9/348; F16F 9/508
See application file for complete search history.

(56) References Cited

U.S. PATENT DOCUMENTS

| 3,794,309 A * | 2/1974 | Chrokey ............... F16F 9/3405 188/322.22 |
| 9,328,792 B2 * | 5/2016 | Ohta ......................... F16F 9/44 |
| 2007/0209855 A1 * | 9/2007 | Burkiewicz ............. B60B 19/00 301/5.1 |

(Continued)

FOREIGN PATENT DOCUMENTS

| DE | 102015101180 A1 * | 10/2015 | ............ F16F 9/3405 |
| DE | 112018008004 T5 | 6/2021 | |

(Continued)

OTHER PUBLICATIONS

International Search Report mailed Sep. 3, 2019 for the corresponding International Patent Application No. PCT/JP2019/029995.

(Continued)

*Primary Examiner* — Ishal R Sahni
(74) *Attorney, Agent, or Firm* — Leason Ellis LLP; Edward J. Ellis; Melvin C. Garner

(57) ABSTRACT

A shock absorber includes a first damping force generating portion, and a second damping force generating portion. The second damping force generating portion includes a first flow path, an opening and closing member, an adjustment unit which adjusts a position of the opening and closing member in the axial direction, a second flow path which is located at a different position from the first flow path and passes through the piston in the axial direction, and a second valve which is disposed at an end portion of the second flow path at a side of a second end portion which is an end portion at an opposite side to the first end portion in the axial direction, and which opens and closes the second flow path.

11 Claims, 11 Drawing Sheets

(56) References Cited

U.S. PATENT DOCUMENTS

| | | | | |
|---|---|---|---|---|
| 2009/0243248 A1* | 10/2009 | Nakamura | ............... | B60G 3/20 |
| | | | | 280/124.135 |
| 2015/0183487 A1* | 7/2015 | Tsai | ....................... | B62K 25/28 |
| | | | | 267/64.22 |
| 2017/0058987 A1 | 3/2017 | Nakano | | |
| 2017/0284495 A1* | 10/2017 | Matsumoto | ........... | F16F 9/3257 |
| 2018/0080520 A1 | 3/2018 | Tsuji | | |
| 2019/0001776 A1* | 1/2019 | Murakami | ............ | F16F 9/5123 |
| 2021/0253194 A1 | 8/2021 | Morishita | | |

FOREIGN PATENT DOCUMENTS

| | | |
|---|---|---|
| JP | 55047657 B2 | 12/1980 |
| JP | 10009326 A | 1/1998 |
| JP | 2008020057 A | 1/2008 |
| JP | 2017044240 A | 3/2017 |
| JP | 2017180801 A | 10/2017 |
| KR | 20170052120 A * | 5/2017 |
| WO | 2016199666 A1 | 12/2016 |

OTHER PUBLICATIONS

German Office Action mailed Oct. 30, 2023 for the corresponding German Patent Applicaiton No. 112019007311.7 (7 pages including English translation).

* cited by examiner

SHOCK ABSORBER AND SADDLE-TYPE VEHICLE

CROSS-REFERENCE TO RELATED APPLICATION(S)

This application is a continuation of PCT application No. PCT/JP2019/029995, which was filed on Jul. 31, 2019, the content of which is incorporated herein by reference in its entirety.

FIELD OF THE INVENTION

The present invention relates to a shock absorber and a saddle-type vehicle.

BACKGROUND OF THE INVENTION

In recent years, a technique for improving damping characteristics when a piston moves at a high speed in a cylinder of a shock absorber and oil flows at a high speed has been proposed.

For example, a shock absorber disclosed in JP-A-2017-180801 includes a holding member which is provided at an opposite side to a piston rod relative to a piston, and holds an outer cylinder and an inner cylinder in a state in which an end portion at one end side of the outer cylinder is disposed at a side where the piston rod is disposed, from an end portion of the inner cylinder at the one end side. The holding member includes a damper accommodating portion which accommodates a damping force generating portion, a first communication passage which allows an inner side of the inner cylinder and the damper accommodating portion to communicate with each other, a second communication passage which allows a gap and the damper accommodating portion to communicate with each other, and a flow path opening portion which is formed at an opposite side to the piston rod relative to an end portion of the outer cylinder and allows the second communication passage and the gap to communicate with each other.

The damping force generating portion of the shock absorber disclosed in JP-A-2017-180801 has a function of adjusting a damping force in a low speed range in which the piston moves at a low speed. However, in the shock absorber disclosed in JP-A-2017-180801, an adjustment of a damping force in a medium speed range in which the piston moves at a medium speed faster than the low speed, or in a high speed range in which the piston moves at a high speed faster than the medium speed can be further improved.

An object of the present invention is to provide a shock absorber and the like which can adjust a damping force over a large moving speed range of a piston.

SUMMARY OF THE INVENTION

Hereinafter, the present disclosure will be described. In the following description, reference numerals in the accompanying drawings are added in parentheses to facilitate understanding of the present disclosure, but the present disclosure is not limited to the following embodiments.

According to an aspect of the present invention, there is provided a shock absorber (1, 2, 3). The shock absorber (1, 2, 3) includes a first damping force generating portion (40) which is fixed to a first end portion (11t) of a cylinder (11) in an axial direction thereof, and a second damping force generating portion (100, 200) which is disposed to be movable in the axial direction in the cylinder. The second damping force generating portion includes a first flow path (121) which passes through a piston (92) in the axial direction, the piston (92) partitioning a space inside the cylinder, an opening and closing member (135) which is disposed at an end portion at a first end portion side of the first flow path, and opens and closes the first flow path, an adjustment unit (190, 140) which adjusts a position of the opening and closing member in the axial direction, a second flow path (122) which is located at a different position from the first flow path and passes through the piston in the axial direction, and a second a second valve (132) which is disposed at an end portion of the second flow path at a side of a second end portion which is an end portion at an opposite side to the first end portion in the axial direction, and which opens and closes the second flow path.

The second damping force generating portion (100, 200) may further include a spring (137) which applies a force in a closing direction to the second valve (132), and a support member (138) which supports an end portion at the second end portion side of the spring (137).

The second damping force generating portion (100, 200) may further include a spring (161) which applies a force in a closing direction to the second valve (132), a support member (162) which supports an end portion at the second end portion side of the spring, and an adjustment portion (170) which adjusts a position of the support member.

The second damping force generating portion (100, 200) may further include a first valve (131) which opens and closes an opening portion at the second end portion side of the first flow path (121).

The second valve (132) may open the second flow path (122) when a pressure of a first end portion side chamber (S1) is equal to or higher than a predetermined pressure (P2), the first end portion side chamber (S1) being defined by the piston (92) in the cylinder (11), and the first damping force generating portion (40) may generate a damping force even when the pressure of the first end portion side chamber is lower than the predetermined pressure.

The second damping force generating portion (100, 200) may include a nut (97) which determines a position of the piston by being fastened to a rod (93, 293) passing through an inner side of the piston at the first end portion side of the piston (92), and the nut may be provided with a communication passage (97a) which allows the first flow path (121) and a space in the cylinder (11) to communicate with each other.

The adjustment unit (190, 140) may be able to adjust a position of the opening and closing member (135) to a position where the opening and closing member closes an opening portion of the communication passage (97a) when the opening and closing member comes into contact with a surface at the one side of the nut (97), and a position where the opening and closing member opens the opening portion of the communication passage when the opening and closing member is separated away from the surface at the first end portion side.

The first end portion side of the cylinder (11) may be disposed at a vehicle body side, and the shock absorber may further includes a rod (93, 293) which holds the piston (92) at an end portion of the rod at the first end portion side, an end portion of the rod at the second end portion side being disposed at a wheel side.

According to another aspect of the present disclosure, there is provided a saddle-type vehicle (10). The saddle-type vehicle (10) includes a vehicle body (4), a front wheel (5) disposed at a front side of the vehicle body in a traveling direction, a rear wheel (6) disposed at a rear side in the traveling direction, a first shock absorber (7) disposed between the vehicle body and the front wheel, and a second shock absorber (1, 2, 3) disposed between the vehicle body and the rear wheel. At least the second shock absorber is any one of the shock absorber (1, 2, 3) described above.

According to the present invention, it is possible to provide a shock absorber or the like which can adjust a damping force over a large moving speed range of a piston.

DETAILED DESCRIPTION OF THE INVENTION

Hereinafter, embodiments will be described in detail with reference to the accompanying drawings. The present invention is not limited to the following embodiments.

First Embodiment

Figure 1:
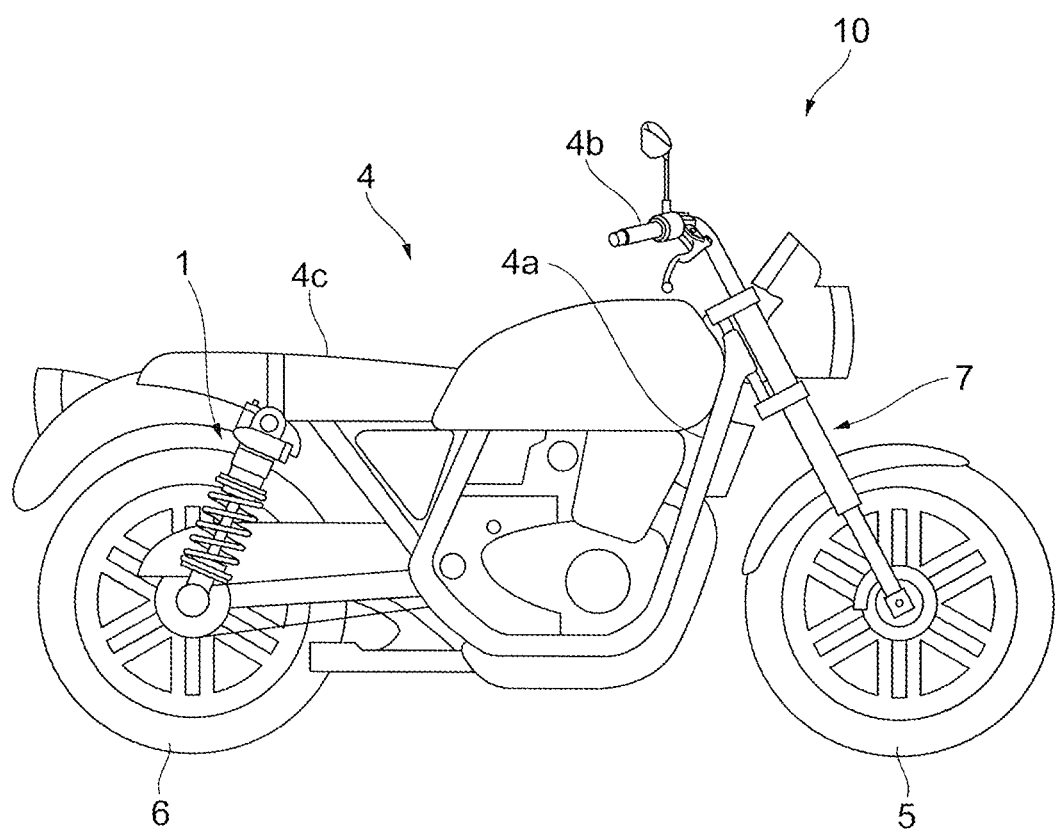
FIG. 1 is a diagram illustrating an example of a schematic configuration of a saddle-type vehicle 10.

FIG. 1 is a diagram illustrating an example of a schematic configuration of a saddle-type vehicle 10.

The saddle-type vehicle 10 includes a vehicle body 4, a front wheel 5 disposed at a front side of the vehicle body 4 in a traveling direction, and a rear wheel 6 disposed at a rear side in the traveling direction. The vehicle body 4 includes a vehicle body frame 4a, a handle 4b, and a seat 4c which form a framework of the saddle-type vehicle 10.

The saddle-type vehicle 10 includes a first shock absorber 7 disposed between the vehicle body 4 and the front wheel 5, and a second shock absorber 1 disposed between the vehicle body 4 and the rear wheel 6. In the following description, the second shock absorber 1 may be simply referred to as a "shock absorber 1".

Figure 2:
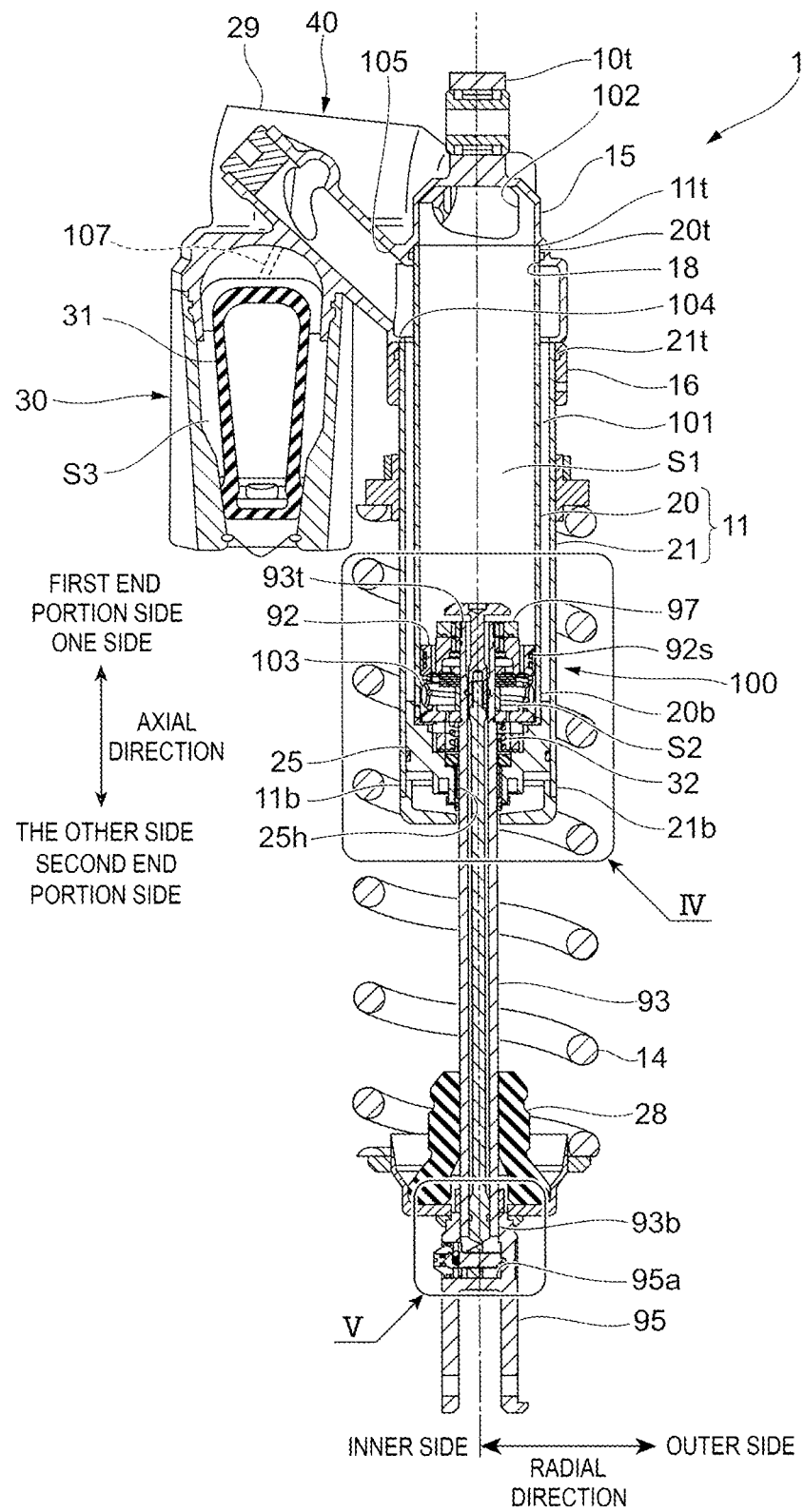
FIG. 2 is a diagram illustrating an example of a schematic configuration of a shock absorber 1 according to a first embodiment.

FIG. 2 is a diagram illustrating an example of a schematic configuration of the shock absorber 1.

Figure 3:
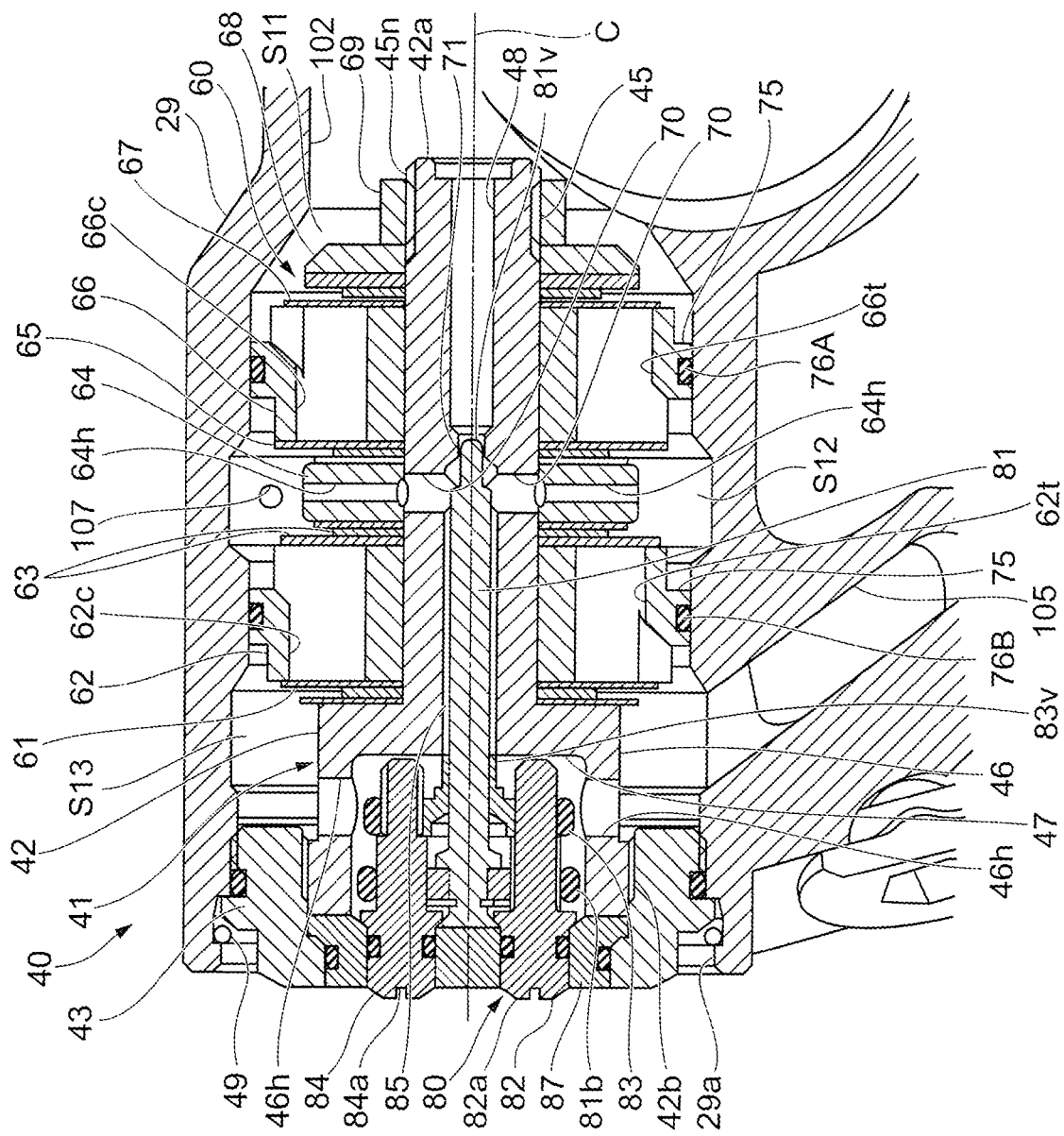
FIG. 3 is a diagram illustrating an example of a cross section of a first damping force generating device 40 provided in the shock absorber 1.

FIG. 3 is a diagram illustrating an example of a cross section of a first damping force generating device 40 provided in the shock absorber 1.

A schematic configuration of the shock absorber 1 and the first damping force generating device 40 will be described with reference to FIGS. 2 and 3.

The shock absorber 1 includes a cylinder 11, a spring 14, a damper case 15, a rod guide 25, a reservoir 30, and the first damping force generating device 40. The cylinder 11, the spring 14, the damper case 15, the rod guide 25, the reservoir 30, and the first damping force generating device 40 may be the same as the cylinder 11, the spring 14, the damper case 15, the rod guide 25, the reservoir 30, and the damping force generating device 40 disclosed in JP-A-2017-180801. In the following description, members and portions of the shock absorber 1 which have the same shape and function as the shock absorber disclosed in JP-A-2017-180801 are denoted by the same reference numerals, and detailed description thereof will be omitted. In the following description, the first damping force generating device 40 may be simply referred to as a "damping force generating device 40".

In the following description, a center line direction of the cylinder 11 may be referred to as an "axial direction". Relative to the axial direction of the cylinder 11, an upper side in FIG. 2 corresponding to a first end portion 11t side may be referred to as one side, and a lower side in FIG. 2 corresponding to a second end portion 11b side may be referred to as the other side. Further, an inner side in a radial direction from the center line of the cylinder 11 may be referred to as an "inner side" and an outer side in the radial direction from the center line of the cylinder 11 may be referred to as an "outer side".

The shock absorber 1 further includes a piston rod 93, a piston 92 fixed to an end portion at the one side of the piston rod 93, and a mounting member 95 fixed to an end portion at the other side of the piston rod 93. The mounting member 95 is different from the axle-side mounting member disclosed in JP-A-2017-180801 in that the mounting member 95 is provided with an insertion hole 95a in the radial direction at a position at the other side from the piston rod 93. The piston 92 is also different from the piston disclosed in JP-A-2017-180801. The piston 92 will be described in detail later.

The shock absorber 1 further includes a second damping force generating device 100. The second damping force generating device 100 is a device which is not provided in the shock absorber disclosed in JP-A-2017-180801. The second damping force generating device 100 will be described in detail later.

Hereinafter, a configuration of the shock absorber 1 will be described in detail.

The cylinder 11 includes an inner cylinder 20 and an outer cylinder 21.

An upper end portion 20t of the inner cylinder 20 is inserted into and held by an inner cylinder holding recessed portion 18 formed in the damper case 15. An upper end portion 21t of the outer cylinder 21 is inserted into and held by an outer cylinder holding portion 16 provided in the damper case 15.

The rod guide 25 is provided inside a lower end portion 21b of the outer cylinder 21. The rod guide 25 is formed with an insertion hole 25h through which the piston rod 93 is inserted, and the piston rod 93 is guided so as to be slidable in the axial direction. The rod guide 25 closes an annular flow path 101 between the inner cylinder 20 and the outer cylinder 21. A rebound spring 32 is provided inside the rod guide 25.

The piston 92 is coupled to an upper end portion 93$t$ of the piston rod 93 by a nut 97. The piston 92 is provided inside the inner cylinder 20 of the cylinder 11 so as to be slidable along the axial direction of the inner cylinder 20 together with the piston rod 93. The piston 92 includes a seal member 92$s$ on an outer circumferential surface. The seal member 92$s$ seals a gap between the outer circumferential surface of the piston 92 and an inner circumferential surface of the inner cylinder 20 when the piston 92 is brought into contact with the inner cylinder 20 of the cylinder 11. An inner space of the inner cylinder 20 of the cylinder 11 is partitioned into an oil chamber S1 and an oil chamber S2 by the seal member 92$s$.

The mounting member 95 is mounted to a lower end portion 93$b$ of the piston rod 93. A bump rubber 28 for preventing bottom striking of the shock absorber 1 is provided at the one side of the mounting member 95 and the piston rod 93 is inserted into the bump rubber 28.

The damper case 15 includes a mounting member 10$t$. One end of a communication passage 102 is opened and formed in the damper case 15 at a position facing an opening of the upper end portion 20$t$ of the inner cylinder 20. The communication passage 102 allows the oil chamber S1 and an oil chamber S11 of the damping force generating device 40 to communicate with each other.

A plurality of oil holes 103 are formed in a lower end portion 20$b$ of the inner cylinder 20 at intervals in a circumferential direction. The oil chamber S2 and the annular flow path 101 communicate with each other through these oil holes 103.

An opening portion 104 is formed in the damper case 15. A communication passage 105 which allows an oil chamber S13 of the damping force generating device 40 and the annular flow path 101 to communicate with each other is formed in continuous with the opening portion 104.

The reservoir 30 includes a bladder 31 filled with a gas such as air. In the reservoir 30, a space outside the bladder 31 serves as an oil reservoir chamber S3 and communicates with an oil chamber S12 of the damping force generating device 40 via a communication passage 107.

The oil chamber S1 and the oil chamber S2 in the cylinder 11, the annular flow path 101, the oil reservoir chamber S3 in the reservoir 30, and the damping force generating device 40 are filled with oil which is a fluid.

(Damping Force Generating Device 40)

The damping force generating device 40 is provided with a damper unit 41 which includes a holder member 42, an outer cap 43, a main damper 60, and a damping adjustment unit 80.

The holder member 42 includes a shaft-shaped portion 45 and a large diameter portion 46. The large diameter portion 46 is formed with a recessed portion 47 which is recessed from the other end 42$b$ side toward the one end 42$a$ side. A plurality of holes 46$h$ which allows the recessed portion 47 and an outer side in the radial direction of the large diameter portion 46 to communicate with each other are formed in the large diameter portion 46 at intervals in the circumferential direction. A central hole 48 which allows the one end 42$a$ and the recessed portion 47 to communicate with each other is continuously formed in the holder member 42 along a center axis C direction of the shaft-shaped portion 45.

The outer cap 43 is provided to close an opening portion 29$a$ of a damper accommodating portion 29, and a C-ring 49 mounted to an inner circumferential surface of the opening portion 29$a$ prevents the outer cap 43 from moving in a direction in which the outer cap 43 is removed from the damper accommodating portion 29.

The main damper 60 includes a check valve 61, a piston 62, a valve 63, an intermediate member 64, a valve 65, a piston 66, a check valve 67, and a stopper plate 68.

A plurality of ports 62$t$ and a plurality of ports 62$c$ are formed in the piston 62, and pass through the piston 62 in the center axis C direction.

The valve 63 is formed by stacking a plurality of disk valves.

The check valve 61 is formed of a disk valve, and is provided to close an outlet of the port 62$c$ at the large diameter portion 46 side.

A plurality of ports 66$c$ and a plurality of ports 66$t$ are formed in the piston 66, and pass through the piston 66 in the center axis C direction.

The valve 65 is formed by stacking a plurality of disk valves.

The check valve 67 is formed of a disk valve, and is provided to close an outlet of the port 66$t$ at the stopper plate 68 side.

A plurality of flow paths 64$h$ are formed in the intermediate member 64 at intervals in the circumferential direction. A flow path 70 extending outward in the radial direction from the central hole 48 is formed in the shaft-shaped portion 45 of the holder member 42 at a position where the flow path 70 communicates with each of the flow paths 64$h$ of the intermediate member 64.

The stopper plate 68 is disposed at the one end 42$a$ side of the shaft-shaped portion 45 of the holder member 42 relative to the check valve 67.

A nut member 69 is screwed into a screw groove 45$n$ formed in the one end 42$a$ of the shaft-shaped portion 45.

The damping adjustment unit 80 includes an adjusting valve 81, an adjuster 82, an adjusting valve 83, and an adjuster 84.

A tip end portion side of the adjusting valve 81 is inserted into the central hole 48 from the recessed portion 47, and a disk-shaped end piece 81$b$ in the recessed portion 47 is coupled to a base end portion side of the adjusting valve 81.

The adjusting valve 81 has an outer diameter smaller than an inner diameter of the central hole 48. Accordingly, a flow path 85 is formed between an inner circumferential surface of the central hole 48 and an outer circumferential surface of the adjusting valve 81. The adjusting valve 81 includes a valve portion 81$v$ at the tip end portion side of the adjusting valve 81. A throttle portion 71 having a reduced inner diameter is formed at the one end 42$a$ side of the holder member 42 from the flow path 70 in the central hole 48, and the valve portion 81$v$ is inserted into the throttle portion 71.

The adjuster 82 extends into the recessed portion 47 and is screwed to the end piece 81$b$. A base portion 82$a$ of the adjuster 82 is exposed to the outside from an inner cap 87. Accordingly, when the adjuster 82 is rotated from an outer side of the damper case 15, the end piece 81$b$ moves forward and backward in the center axis C direction along the adjuster 82. Then, the valve portion 81$v$ of the adjusting valve 81 moves forward and backward relative to the throttle portion 71, and a gap between the throttle portion 71 and the valve portion 81$v$ is increased and reduced.

The adjusting valve 83 is provided in the recessed portion 47 and integrally includes a cylindrical valve portion 83$v$ which extends toward an opening of the central hole 48 at the recessed portion 47 side.

The adjuster 84 extends into the recessed portion 47 and is screwed to the adjusting valve 83. A base portion 84a of the adjuster 84 is exposed to the outside from the inner cap 87. Accordingly, when the adjuster 84 is rotated from an outer side of the damper case 15, the adjusting valve 83 moves forward and backward in the center axis C direction. Then, the valve portion 83v of the adjusting valve 83 moves forward and backward relative to the opening of the central hole 48, and a gap between the valve portion 83v and the flow path 85 is increased and reduced.

In the damping force generating device 40 described above, a protruding wall 75 which protrudes outward in the radial direction is formed continuously in the circumferential direction on outer circumferential surfaces of the piston 62 and the piston 66. Seal rings 76A and 76B are provided on an outer circumferential surface of the protruding wall 75. Since the seal rings 76A and 76B abut against an inner circumferential surface of the damper accommodating portion 29, the seal rings 76A and 76B seal gaps between the piston 62 and the inner circumferential surface of the damper accommodating portion 29 and between the piston 66 and the inner circumferential surface of the damper accommodating portion 29.

An inner side of the damper accommodating portion 29 is partitioned into the oil chamber S11, the oil chamber S12, and the oil chamber S13 by the seal ring 76A of the piston 66 and the seal ring 76B of the piston 62.

(Second Damping Force Generating Device 100)

Figure 4:
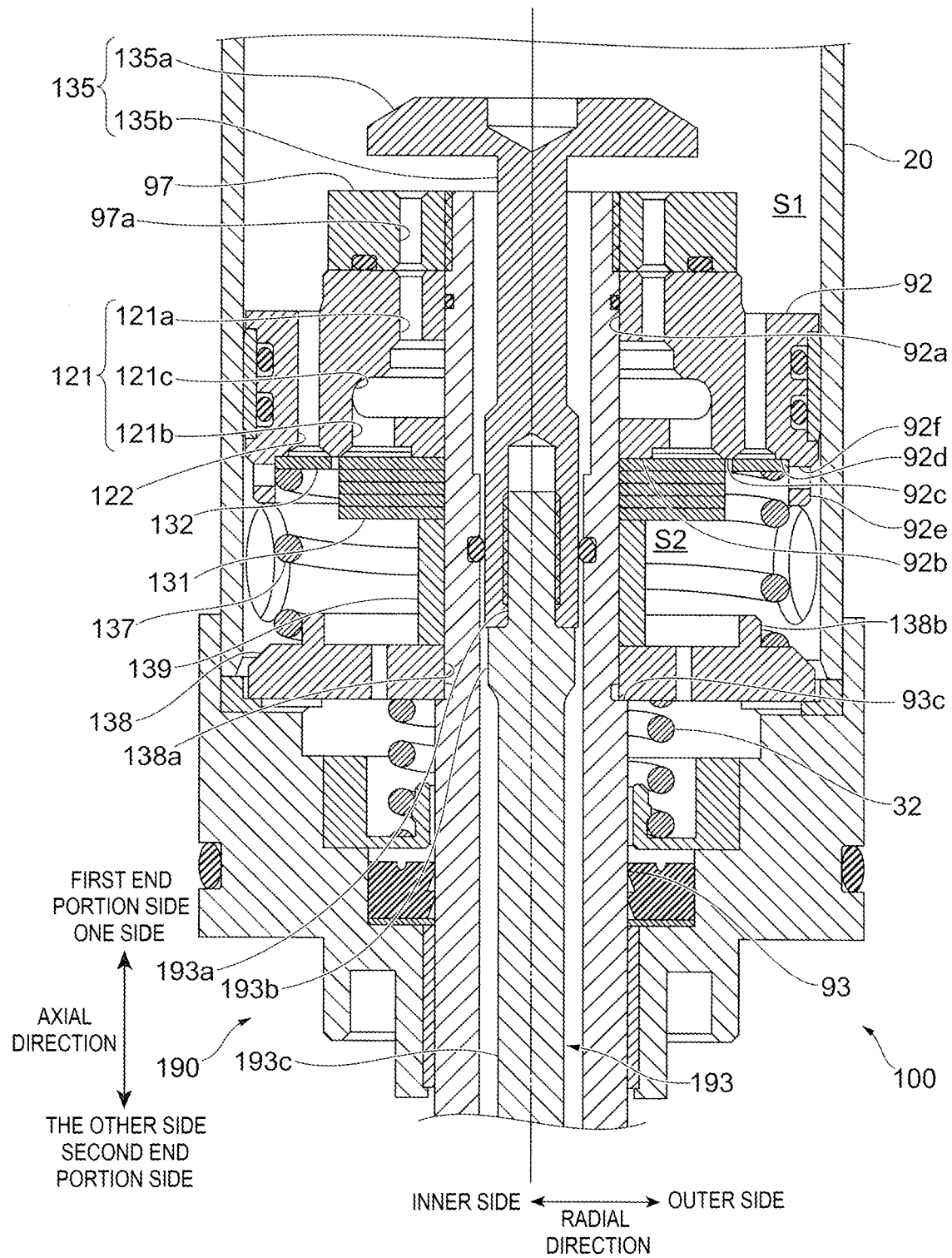
FIG. 4 is an enlarged view illustrating a portion IV in FIG. 2.

FIG. 4 is an enlarged view illustrating a portion IV in FIG. 2.

Figure 5:
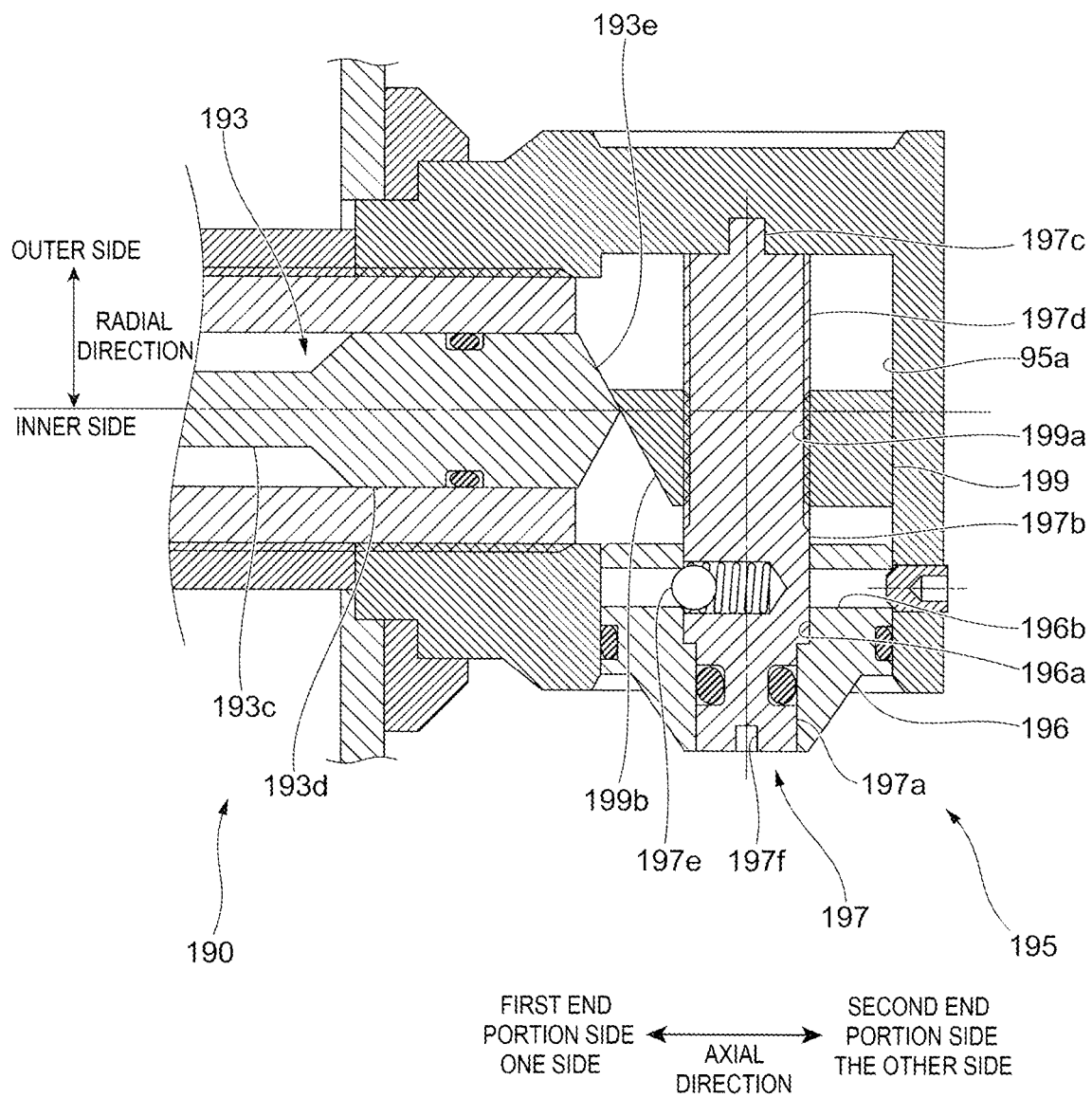
FIG. 5 is an enlarged view illustrating a portion V in FIG. 2.

FIG. 5 is an enlarged view illustrating a portion V in FIG. 2.

The second damping force generating device 100 will be described mainly with reference to FIGS. 4 and 5.

The second damping force generating device 100 includes a first flow path 121 which passes through the piston 92 in the axial direction of the piston 92 partitioning a space inside the cylinder 11, and a first valve 131 which is disposed at an end portion at the other side of the first flow path 121 and opens and closes the first flow path 121. The second damping force generating device 100 includes an opening and closing member 135 which is disposed at an end portion at the one side of the first flow path 121 and opens and closes the first flow path 121, and an adjustment unit 190 which adjusts a position of the opening and closing member 135 in the axial direction. The piston rod 93 is provided with a seal ring which is fitted into a groove recessed from an inner circumferential surface. The seal ring seals a gap between the inner circumferential surface of the piston rod 93 and an outer circumferential surface of the opening and closing member 135.

The second damping force generating device 100 further includes a second flow path 122 which passes through the piston 92 in the axial direction of the piston 92 at a position different from the position of the first flow path 121, more specifically, at a position outside the first flow path 121, and a second valve 132 which opens and closes the second flow path 122. The second damping force generating device 100 includes a second spring 137 which applies a force in a closing direction to the second valve 132, and a support member 138 which supports an end portion at the other side of the second spring 137. The support member 138 has a function of limiting a movement of the piston rod 93 to the other side by abutting against the rebound spring 32 at the time of an extension side stroke.

The second damping force generating device 100 includes a cylindrical collar 139 which is disposed to surround the piston rod 93 and determines a distance between the first valve 131 and the support member 138.

The first flow path 121 is formed at a position outside a central hole 92a through which the piston rod 93 passes. The central hole 92a is formed in a central portion in the radial direction of the piston 92. A plurality of first flow paths 121 are formed at equal intervals in the circumferential direction. Each of the first flow paths 121 includes a first portion 121a which is formed at an end portion at the one side and extends into a columnar shape in the axial direction, and a second portion 121b which is formed at an end portion at the other side and extends into a columnar shape in the axial direction. The first portion 121a is formed inward from the second portion 121b. Each of the first flow paths 121 is formed to extend outward in the radial direction from the central hole 92a, and includes a third portion 121c which connects the first portion 121a and the second portion 121b.

The second flow path 122 is formed at a position outside the first flow path 121. A plurality of second flow paths 122 are formed at equal intervals in the circumferential direction. An inner diameter of the second flow path 122 is smaller than an inner diameter of the first flow path 121.

The first valve 131 is formed by stacking a plurality of annular disk valves. An inner diameter of the first valve 131 is larger than an outer diameter of the piston rod 93, and the first valve 131 is disposed to surround the piston rod 93.

The second valve 132 is a single annular disk valve. An inner diameter of the second valve 132 is larger than an outer diameter of the first valve 131, and the second valve 132 is disposed at a position outside the first valve 131. The second valve 132 is disposed to surround the first valve 131.

The first valve 131 disposed to close an opening portion at the other side of the first flow path 121 and the second valve 132 disposed to close an opening portion at the other side of the second flow path are both disposed at an end portion at the other side of the piston 92.

The piston 92 has an annular support surface 92b which supports the first valve 131 around the central hole 92a at an end surface at the other side. The piston 92 has an annular support surface 92c which supports an outer end portion of the first valve 131 between the first flow path 121 and the second flow path 122. The support surface 92c also supports an inner end portion of the second valve 132. The piston 92 has an annular support surface 92d which supports an outer end portion of the second valve 132 at an outer side from the second flow path 122. The piston 92 has an outer wall 92e which protrudes to the other side from the support surface 92d around the support surface 92d. The outer wall 92e prevents a movement of the second valve 132 in the radial direction. The outer wall 92e is formed with a through hole 92f which passes through the outer wall 92e in the radial direction.

The nut 97 is a cylindrical member formed, on an inner circumferential surface of the nut 97, with a female screw which engages with a male screw formed at an end portion at the one side of the piston rod 93. An outer diameter of the nut 97 is set such that an outer circumferential surface of the nut 97 is positioned outward from the first portion 121a of the first flow path 121 and inward from the second flow path 122. The nut 97 is provided with a communication passage 97a which passes through the nut 97 in the axial direction at an outer side of the female screw and allows the first flow path 121 and the oil chamber S1 to communicate with each other. Therefore, the nut 97 opens opening portions of the first flow path 121 and the second flow path 122 at the one side. The nut 97 is provided with a seal ring on a surface at the other side, and the seal ring seals a gap between the nut 97 and the piston 92 when the nut 97 comes into contact with a surface at the one side of the piston 92.

The opening and closing member 135 includes a plate-shaped portion 135a which has a disk shape and is provided at the one side, and a columnar portion 135b which has a columnar shape and is provided at the other side. An outer diameter of the plate-shaped portion 135a is set such that an outer circumferential surface of the plate-shaped portion 135a is positioned outside the communication passage 97a. An end portion at the other side of the columnar portion 135b is formed with a recessed portion into which a first portion 193a of a holding member 193 to be described later is fitted, and an inner circumferential surface of the recessed portion is formed with a female screw which engages with a male screw formed on an outer circumferential surface of the first portion 193a.

The support member 138 is a disk-shaped member in which a central hole 138a is formed in a central portion in the radial direction of the support member 138. A diameter of the central hole 138a is larger than an outer diameter of the piston rod 93, and the support member 138 is disposed outside the piston rod 93. An outer diameter of the support member 138 is larger than an outer diameter of the second spring 137. The support member 138 includes a holding portion 138b which protrudes from an end surface at the one side to the one side and holds an end portion at the other side of the second spring 137. A surface at the other side of the support member 138 comes into contact with a stepped portion 93c provided at the piston rod 93, thereby preventing the support member 138 from moving to the other side.

The collar 139 is a cylindrical member. An inner diameter of the collar 139 is larger than the outer diameter of the piston rod 93, and the collar 139 is disposed to surround the piston rod 93. An outer diameter of the collar 139 is smaller than an outer diameter of the support surface 92b of the piston 92. The collar 139 supports an inner portion of the first valve 131 such that an outer portion of the first valve 131 is deflectable and deformable.

The piston 92, the first valve 131, the collar 139, and the support member 138 are interposed between the nut 97 and the stepped portion 93c of the piston rod 93 by fastening the nut 97 to an end portion at the one side of the piston rod 93.

[Adjustment Unit 190]

The adjustment unit 190 includes the holding member 193 which holds the opening and closing member 135, and an operation portion 195 which can change a position of the opening and closing member 135 by a rotation operation.

The holding member 193 includes the first portion 193a, a second portion 193b, a third portion 193c, and a fourth portion 193d in this order from the one side to the other side. The first portion 193a, the second portion 193b, the third portion 193c, and the fourth portion 193d are four columnar portions having different diameters. Outer diameters of the first portion 193a, the second portion 193b, the third portion 193c, and the fourth portion 193d are all smaller than an inner diameter of the piston rod 93. The holding member 193 is inserted into a through hole which passes through the piston rod 93 in the axial direction of the piston rod 93.

An end portion at the one side of the first portion 193a is formed with a male screw which engages with a female screw formed at the opening and closing member 135.

An outer diameter of the second portion 193b is larger than an outer diameter of the first portion 193a. An end surface at the one side of the second portion 193b prevents the opening and closing member 135 from moving to the other side.

An outer diameter of the third portion 193c is smaller than an outer diameter of the second portion 193b, and an outer diameter of the fourth portion 193d is larger than the outer diameter of the third portion 193c. The fourth portion 193d is provided with a seal ring which is fitted into a groove recessed from an outer circumferential surface of the fourth portion 193d. The seal ring seals a gap between the holding member 193 and an inner circumferential surface of the piston rod 93. An end portion at the other side of the fourth portion 193d is chamfered to have a chamfered portion 193e so that a distance from the center line is gradually reduced from the one side to the other side.

The operation portion 195 includes a base 196 fitted into the insertion hole 95a, and an adjuster 197 which is rotated from the outside. The operation portion 195 includes a positioning member 199 which determines a position of the holding member 193 in the axial direction when the operation portion 195 is moved in the radial direction of the cylinder 11 due to an operation of the adjuster 197.

The base 196 is a cylindrical member in which a central hole 196a is formed in a central portion of the base 196. The base 196 is provided with a seal ring fitted into a groove recessed from an outer circumferential surface of the base 196, and the seal ring seals a gap between the base 196 and the insertion hole 95a. The base 196 is formed with, at equal intervals in the circumferential direction, a plurality of communication holes 196b which allows an inner side of the central hole 196a and an outer side of the base 196 to communicate with each other.

The adjuster 197 is provided with a first portion 197a, a second portion 197b, and a third portion 197c in this order. The first portion 197a, the second portion 197b, and the third portion 197c are three columnar portions having different diameters. The first portion 197a is inserted into the central hole 196a of the base 196, and the third portion 197c is supported by a recessed portion formed in the mounting member 95. The recessed portion rotatably supports the adjuster 197. The first portion 197a is provided with a seal ring fitted into a groove recessed from an outer circumferential surface of the first portion 197a, and the seal ring seals a gap between the adjuster 197 and an inner circumferential surface of the base 196. A male screw 197d is formed on an outer circumferential surface of the second portion 197b. The adjuster 197 includes a coil spring inserted into a recessed portion formed in the axial direction, and a fitting member 197e which is supported by the coil spring and is fitted into the communication hole 196b of the base 196 when the coil spring protrudes from an outer circumferential surface, for example, in a case where the coil spring has a free length. The adjuster 197 is formed with an operation groove 197f which is recessed inward in a rectangular parallelepiped shape from an outer end surface.

The positioning member 199 is a cylindrical member and is inserted into the insertion hole 95a. An inner circumferential surface of the positioning member 199 is formed with a female screw 199a which engages with the male screw 197d formed at the second portion 197b of the adjuster 197. The positioning member 199 is chamfered to have a chamfered portion 199b at a portion facing the chamfered portion 193e of the holding member 193.

[Function of Adjustment Unit 190]

In the adjustment unit 190, when the adjuster 197 of the operation portion 195 is rotated from an outer side of the mounting member 95, the male screw 197d formed at the adjuster 197 is engaged with the female screw 199b formed at the positioning member 199, so that the positioning member 199 moves in the radial direction. For example, in a case where the male screw 197*d* and the female screw 199*b* are left-handed screws, when the adjuster 197 is rotated clockwise, the positioning member 199 moves in a direction away from the base 196. Then, a position of the chamfered portion 193*e* of the holding member 193 moves to the other side along the chamfered portion 199*b* of the positioning member 199. As the holding member 193 moves to the other side, the opening and closing member 135 moves to the other side, and the plate-shaped portion 135*a* of the opening and closing member 135 closes an opening portion of the communication passage 97*a*. As a result, the first flow path 121 is closed. On the other hand, for example, in a case where the male screw 197*d* and the female screw 199*b* are left-handed screws, when the adjuster 197 is rotated counterclockwise, as the positioning member 199 moves in a direction of coming close to the base 196, the chamfered portion 193*e* of the holding member 193 moves to the one side and the opening and closing member 135 moves to the one side. As a result, the plate-shaped portion 135*a* of the opening and closing member 135 opens the opening portion of the communication passage 97*a*. As a result, the first flow path 121 is opened.

[Function of Second Damping Force Generating Device 100]

In the second damping force generating device 100 having the above-described configuration, in a case where the opening and closing member 135 opens the opening portion of the communication passage 97*a* of the nut 97, thereby opening an opening portion at the one side of the first flow path 121, the second damping force generating device 100 is set as follows. That is, the first valve 131 opens the first flow path 121 when a pressure Ps of the oil chamber S1 is equal to or higher than a predetermined first pressure P1. The second valve 132 opens the second flow path 122 when the pressure Ps is equal to or higher than a predetermined second pressure P2 (>the first pressure P1). A pressure at which the valve 65 of the damping force generating device 40 is opened is set to be lower than the pressure at which the first valve 131 is opened.

On the other hand, in a case where the opening and closing member 135 closes the opening portion of the communication passage 97*a* of the nut 97, thereby closing the first flow path 121, the first valve 131 is not opened. In such a case, when the pressure Ps of the oil chamber S1 is equal to or higher than the second pressure P2, the second flow path 122 is opened.

[Function of Shock Absorber 1]
<Extension Side Stroke>

In an extension side stroke in which the piston 92 moves to a rear wheel side in the cylinder 11 due to an upward and downward movement of the rear wheel, oil in the oil chamber S2 is compressed by the piston 92. Then, the oil in the oil chamber S2 passes through the oil hole 103 formed in a lower end portion of the inner cylinder 20 and flows into the cylindrical annular flow path 101 formed between the inner cylinder 20 and the outer cylinder 21. The oil flowing through the annular flow path 101 passes through the opening portion 104 and communication passage 105 formed in the damper case 15, and is fed into the oil chamber S13 of the damping force generation device 40.

The oil fed into the oil chamber S13 flows into the ports 62*t* of the piston 62, and push-opens the valve 63 provided at an outlet side of the oil chamber S13, thereby generating a damping force. The oil which push-opens the valve 63 and passes through the valve 63 flows into the oil chamber S12.

Apart of the oil fed into the oil chamber S13 flows into the recessed portion 47 from the hole 46*h* formed in the large diameter portion 46 of the holder member 42. Then, the oil passes through a gap between the valve portion 83*v* of the adjusting valve 83 and the flow path 85, and flows out to the oil chamber S12 through the flow path 85, the flow path 70 formed at the shaft-shaped portion 45, and the flow path 64*h* formed at the intermediate member 64. When the oil passes through the gap between the valve portion 83*v* of the adjusting valve 83 and the flow path 85, a damping force is generated. The adjusting valve 83 is moved forward or backward by the adjuster 84 to adjust the gap between the valve portion 83*v* of the adjusting valve 83 and the flow path 85, so that the damping force generated when the oil passes through the gap can be adjusted.

In order to compensate for a volume change of the piston rod 93 in the cylinder 11 due to a movement of the piston 92, the oil passes through the communication passage 107 formed at the damper case 15 and flows from the oil reservoir chamber S3 into the oil chamber S12.

The oil which flowed into the oil chamber S12 passes through the port 66*t* of the piston 66, push-opens the check valve 67, and flows into the oil chamber S11.

The oil in the oil chamber S11 is fed into the oil chamber S1 through the communication passage 102 formed at the damper case 15.

<Compression Side Stroke>

In a compression side stroke in which the piston 92 moves to a vehicle body side in the cylinder 11, the oil in the oil chamber S1 is compressed by the piston 92. Then, the oil in the oil chamber S1 is fed into the oil chamber S11 through the communication passage 102.

The oil fed into the oil chamber S11 flows into the port 66*c*, push-opens the valve 65 provided at an outlet side of the oil chamber S11, and flows out to the oil chamber S12. When the oil push-opens the valve 65 and the oil passes through the valve 65, a damping force is generated.

A part of the oil in the oil chamber S11 flows into the central hole 48 opened in the one end 42*a* of the holder member 42, passes through a gap between the valve portion 81*v* of the adjusting valve 81 and the throttle portion 71, and flows out to the oil chamber S12 via the flow path 70 formed at the shaft-shaped portion 45 and the flow path 64*h* formed at the intermediate member 64. When the oil passes through the gap between the valve portion 81*v* of the adjusting valve 81 and the throttle portion 71, a damping force is generated. The adjusting valve 81 is moved forward and backward by the adjuster 82 to adjust the gap between the valve portion 81*v* and the throttle portion 71, so that the damping force generated when the oil passes through the gap between the valve portion 81*v* and the throttle portion 71 can be adjusted.

In order to compensate for a volume change of the piston rod 93 in the cylinder 11 due to a movement of the piston 92, a part of the oil which flowed into the oil chamber S12 passes through the communication passage 107 and flows into the oil reservoir chamber S3. The remaining part of the oil which flowed into the oil chamber S12 flows into the port 62*c* of the piston 62, push-opens the check valve 61, and flows into the oil chamber S13.

The oil which flowed into the oil chamber S13 flows into the oil chamber S2 through the communication passage 105, the annular flow path 101, and the plurality of oil holes 103.

In a case where the opening and closing member 135 opens the opening portion of the communication passage 97*a*, thereby opening the first flow path 121, when the pressure Ps in the oil chamber S1 is equal to or higher than the first pressure P1, the second damping force generating device 100 also generates a damping force.

When the pressure Ps is equal to or higher than the first pressure P1 and lower than the second pressure P2, the oil in the oil chamber S1 push-opens the first valve 131 provided at the other side end portion of the first flow path 121, and flows out to the oil chamber S2. When the oil push-opens the first valve 131 and passes through the first valve 131, a damping force is generated.

When the pressure Ps is equal to or higher than the second pressure P2, the oil in the oil chamber S1 further push-opens the second valve 132 provided at the other side end portion of the second flow path 122 in addition to the first valve 131, and flows out to the oil chamber S2. When the oil push-opens second valve 132 and passes through the through hole 92f or the like, a damping force is generated.

On the other hand, in a case where the opening and closing member 135 closes the opening portion of the communication passage 97a of the nut 97, thereby closing the first flow path 121, when the pressure Ps in the oil chamber S1 is equal to or higher than the second pressure P2, the oil in the oil chamber S1 push-opens the second valve 132 provided at an end portion at the other side of the second flow path 122, and flows out to the oil chamber S2. When the oil push-opens second valve 132 and passes through the through hole 92f or the like, a damping force is generated.

Figure 6:
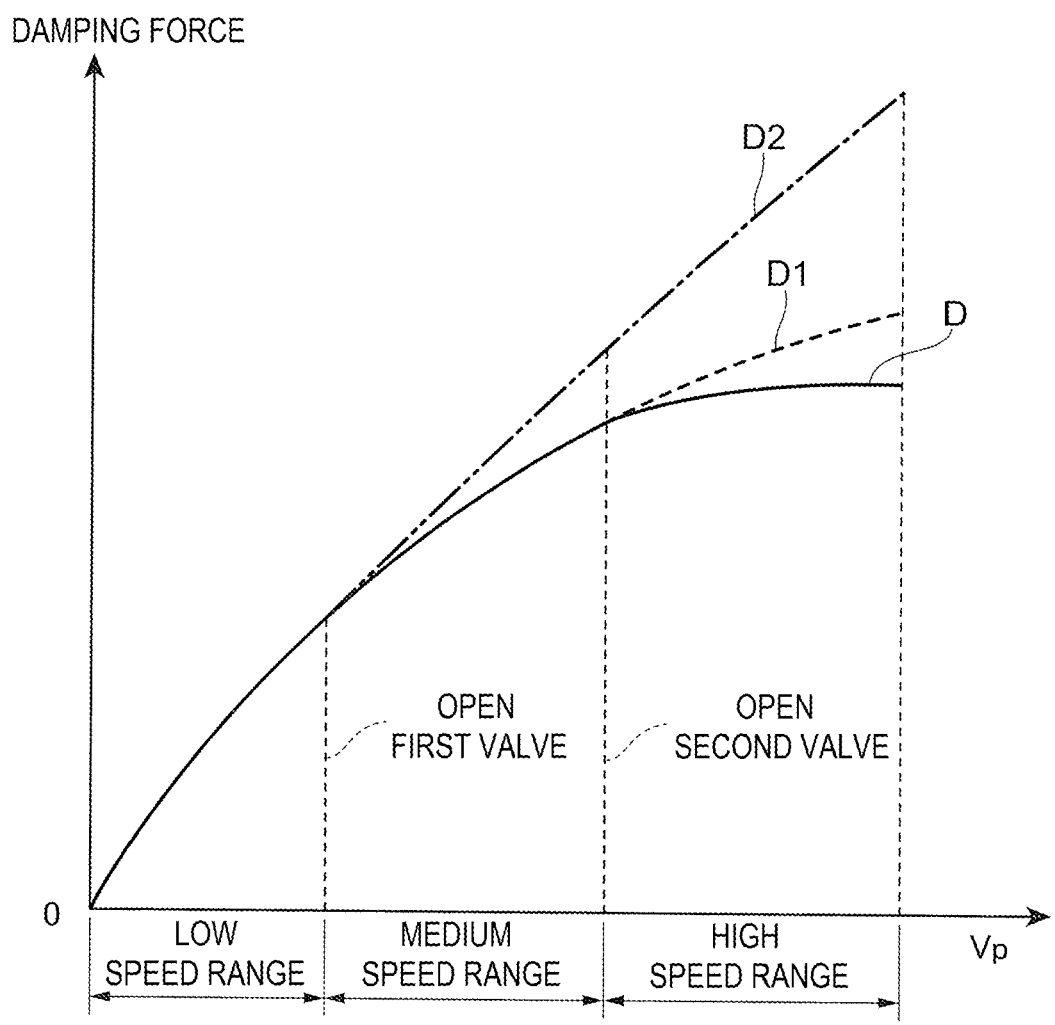
FIG. 6 is a diagram illustrating an example of a relationship between a speed Vp of a piston 92 and a damping force during a compression side stroke when an opening and closing member 135 opens an opening portion of a communication passage 97a of a nut 97.

FIG. 6 is a diagram illustrating an example of a relationship between a speed Vp of the piston 92 and a damping force during a compression side stroke when the opening and closing member 135 opens the opening portion of the communication passage 97a of the nut 97.

Since the pressures at which the first valve 131 and the second valve 132 of the second damping force generation device 100 and the valve 65 of the damping force generating device 40 are opened are set as described above, the relationship between the speed Vp of the piston 92 and the damping force during the compression side stroke is as illustrated in FIG. 6. In FIG. 6, a damping force D of the shock absorber 1 according to the first embodiment is indicated by a solid line. A damping force D1 of a configuration (hereinafter, may be referred to as a "first comparative configuration") in which the second valve 132 is not opened as compared with the shock absorber 1 is indicated by a dashed line. A damping force D2 of a configuration (hereinafter, may be referred to as a "second comparative configuration") in which the first valve 131 and the second valve 132 are not opened as compared with the shock absorber 1 is indicated by a two-dot chain line.

In the second comparative configuration, no damping force is generated in the second damping force generating device 100, and a damping force corresponding to the speed Vp is generated in the damping force generating device 40.

In the shock absorber 1 and the first comparative configuration, since the first valve 131 of the second damping force generating device 100 is opened, the damping force D and the damping force D1 are smaller than the damping force D2 at a speed equal to or higher than the speed Vp at which the pressure Ps equals to a pressure at which the first valve 131 is opened.

In the shock absorber 1, the first valve 131 and the second valve 132 of the second damping force generating device 100 are opened at a speed equal to or higher than the speed Vp at which the pressure Ps is equal to or higher than a pressure at which the second valve 132 is opened. Therefore, the damping force D is smaller than the damping force D1 and the damping force D2 at a speed equal to or higher than the speed Vp.

Therefore, according to the shock absorber 1, ride comfort in the high speed range in which the speed Vp is high and the first valve 131 and the second valve 132 of the second damping force generating device 100 are opened can be improved compared with the ride comfort in the first comparative configuration and the second comparative configuration. According to the shock absorber 1, ride comfort in the medium speed range in which the speed Vp is high, the second valve 132 of the second damping force generating device 100 is not opened, and the first valve 131 is opened can be improved compared with the ride comfort in the second comparative configuration.

Since the shock absorber 1 includes the adjustment unit 190, the damping forces D in the medium speed range and the high speed range can be adjusted.

For example, the ride comfort in the low speed range and the medium speed range is good but the ride comfort in the high speed range is poor in the second comparative configuration. In this case, it is conceivable to change specifications of the valve 65 or the like in the damping force generating device 40 in order to improve the ride comfort in the high speed range. However, when the valve specifications of the damping force generating device 40 are changed in order to improve the ride comfort in the high speed range, damping characteristics in the low speed range and the medium speed range also change. Therefore, in the second comparative configuration, when the valve specifications are changed in order to improve the ride comfort in the high speed range, the ride comfort in the low speed range and the medium speed range may deteriorate.

On the other hand, since the shock absorber 1 includes the second damping force generating device 100, the damping force in the medium speed range and the damping force in the high speed range can be adjusted independently of the adjustment of the damping force in the low speed range in which the damping force is adjusted using the damping force generating device 40. Therefore, according to the shock absorber 1, the damping force can be adjusted in a large moving speed range (large Vp range) of the piston compared with the second comparative configuration in which the damping forces in the low speed range, the medium speed range, and the high speed range cannot be independently controlled.

Figure 7:
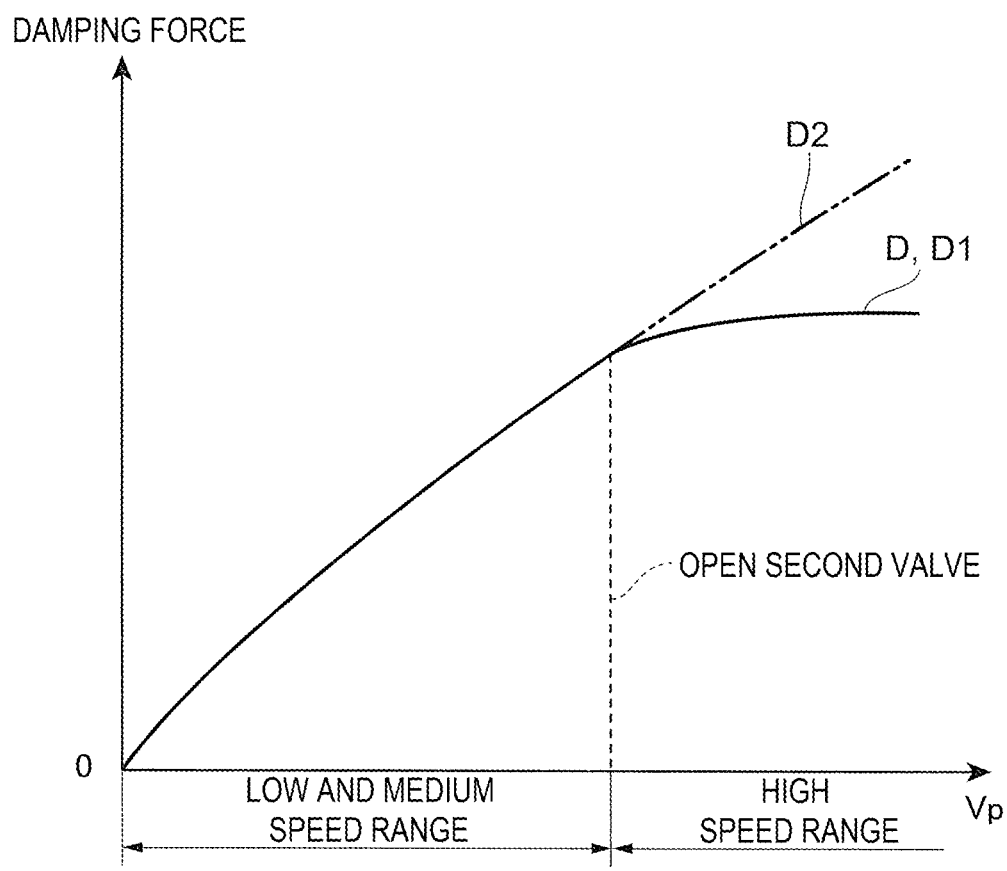
FIG. 7 is a diagram illustrating an example of a relationship between the speed Vp of the piston 92 and a damping force during a compression side stroke when the opening and closing member 135 closes the opening portion of the communication passage 97a of the nut 97.

FIG. 7 is a diagram illustrating an example of a relationship between the speed Vp of the piston 92 and a damping force during a compression side stroke when the opening and closing member 135 closes the opening portion of the communication passage 97a.

When the opening and closing member 135 closes the opening portion of the communication passage 97a of the nut 97, since the pressures at which the second valve 132 of the second damping force generation device 100 and the valve 65 of the damping force generating device 40 are opened are set as described above, the relationship between the speed Vp of the piston 92 and the damping force during the compression side stroke is as illustrated in FIG. 7. A damping force D of the shock absorber 1 is indicated by a solid line. A damping force D2 of a configuration (hereinafter, may be referred to as a "second comparative configuration") in which the first valve 131 and the second valve 132 are not opened as compared with the shock absorber 1 is indicated by a two-dot chain line.

In the second comparative configuration, no damping force is generated in the second damping force generating device 100, and a damping force corresponding to the speed Vp is generated in the damping force generating device 40.

In the shock absorber 1, the second valve 132 of the second damping force generating device 100 is opened at a speed equal to or higher than the speed Vp at which the pressure Ps is equal to or higher than a pressure at which the second valve 132 is opened. Therefore, the damping force D is smaller than the damping force D2 at a speed equal to or higher than the speed Vp.

Therefore, according to the shock absorber 1, ride comfort in the high speed range in which the speed Vp is high and the second valve 132 of the second damping force generating device 100 is opened can be improved compared with the ride comfort in the second comparative configuration. The ride comfort in the high speed range can be adjusted by changing specifications of the second spring 137. Therefore, apart from the adjustment of the damping force in the low speed range generated by the damping force generating device 40, the damping force in the high speed range can be adjusted independently. Therefore, according to the shock absorber 1, the damping force can be adjusted in a large moving speed range (large Vp range) of the piston compared with the second comparative configuration in which the damping forces in the medium or low speed range and the damping force in the high speed range cannot be independently controlled.

Even when the adjustment unit 190 adjusts the opening and closing member 135 so as to close the opening portion of the communication passage 97a of the nut 97 in order to improve a function of pressing the rear wheel against a road surface so as to improve steering stability, the second valve 132 of the second damping force generating device 100 is opened in the high speed range. Therefore, even when the opening and closing member 135 is adjusted to close the first flow path 121, the shock absorber 1 can prevent a pressure in the cylinder 11 from becoming excessively high.

Second Embodiment

Figure 8:
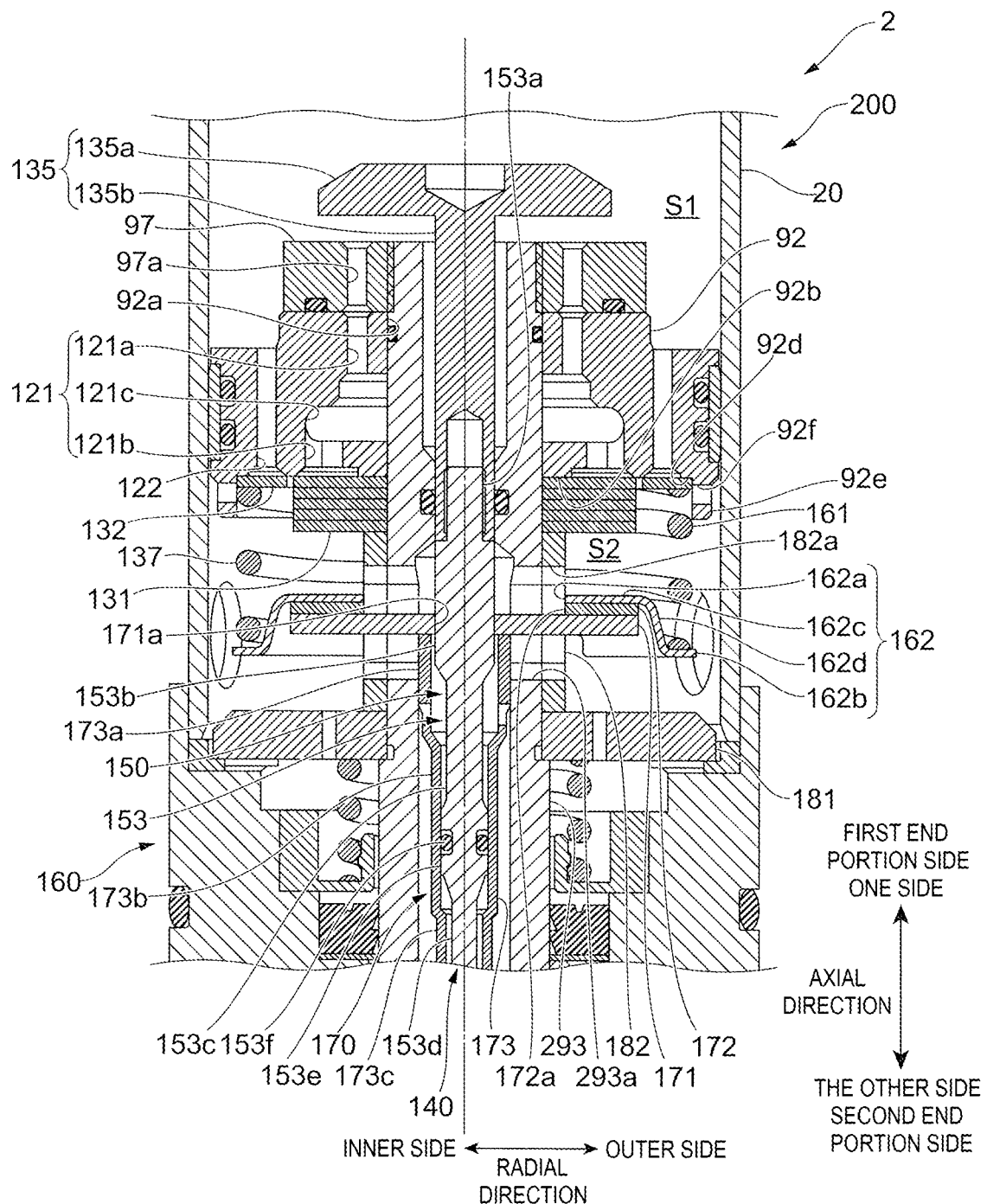
FIG. 8 is a diagram illustrating an example of a cross section of a shock absorber 2 according to a second embodiment.
Figure 9:
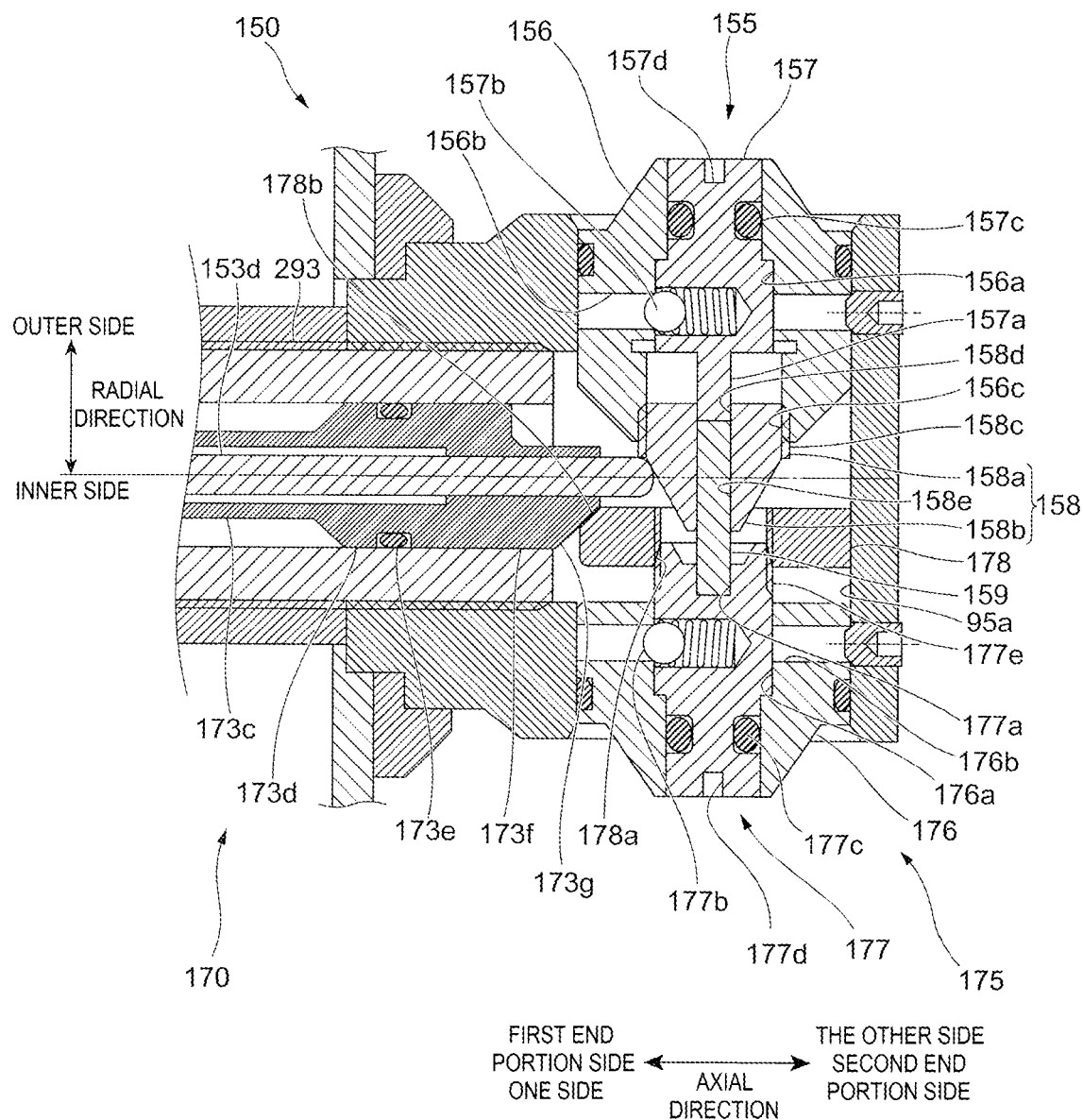
FIG. 9 is a diagram illustrating an example of a cross section of the shock absorber 2 according to the second embodiment.

FIGS. 8 and 9 are views illustrating an example of a cross section of a shock absorber 2 according to a second embodiment.

Figure 10:
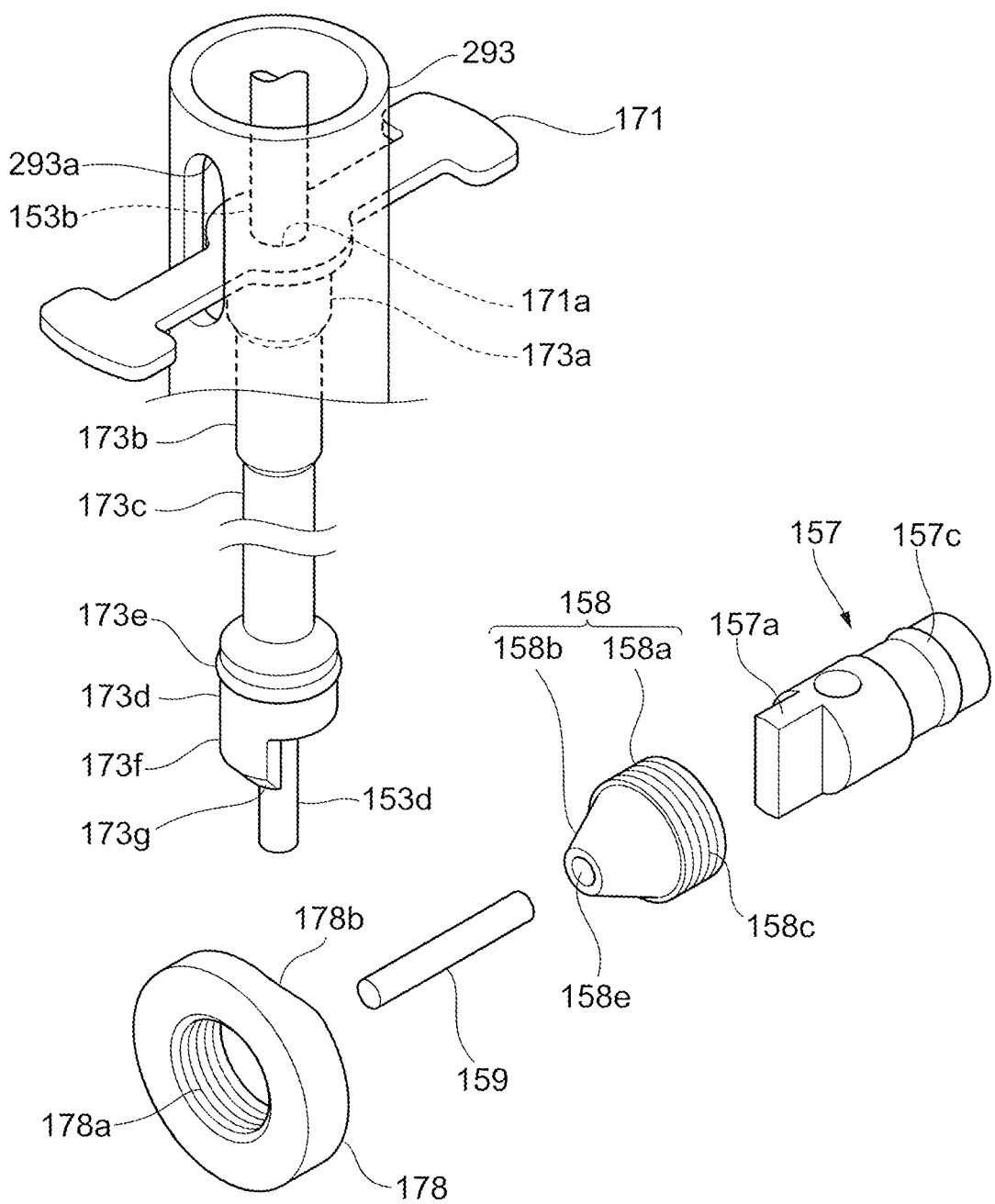
FIG. 10 is a diagram illustrating an example of a perspective view of a part of a second damping force generating device 200 according to the second embodiment.

FIG. 10 is a diagram illustrating an example of a perspective view of a part of a second damping force generating device 200 according to the second embodiment.

The shock absorber 2 is different from the shock absorber 1 in that the shock absorber 2 includes the second damping force generating device 200 instead of the second damping force generating device 100. The shock absorber 2 is different from the shock absorber 1 in that the shock absorber 2 includes a piston rod 293 instead of the piston rod 93 according to the first embodiment. The piston rod 293 is different from the piston rod 93 in that the piston rod 293 is formed with a communication hole 293a which allows an inner side and an outer side of the piston rod 293 to communicate with each other. An inner diameter of the piston rod 293 is larger than an inner diameter of the piston rod 93, and a contact member 173 to be described later can be accommodated in the piston rod 293.

Hereinafter, differences of the second damping force generating device 200 from the second damping force generating device 100 will be described. Components having the same function in the second damping force generating device 200 and the second damping force generating device 100 are denoted by the same reference numerals, and detailed description thereof will be omitted.

The second damping force generating device 200 includes a first adjustment unit 140 which adjusts a position of the opening and closing member 135 in the axial direction, instead of the adjustment unit 190. The second damping force generating device 200 includes a second adjustment unit 160 which adjusts a force required to open the second valve 132. The second damping force generating device 200 includes an annular limiting member 181 which limits a movement of the piston rod 93 to the other side by abutting against the rebound spring 32 during the extension side stroke. The second damping force generating device 200 includes a cylindrical collar 182 which is disposed to surround the piston rod 293 and determines a distance between the first valve 131 and the limiting member 181. A communication hole 182a which allows an inner side and an outer side of the collar 182 to communicate with each other is formed in the collar 182 at a position corresponding to the communication hole 293a of the piston rod 293.

[First Adjustment Unit 140]

The first adjustment unit 140 includes a first adjustment portion 150 which adjusts a position of the opening and closing member 135. The first adjustment portion 150 includes a holding member 153 which holds the opening and closing member 135, and a first operation portion 155 which can change a position of the opening and closing member 135 by a rotation operation.

The holding member 153 includes a first portion 153a, a second portion 153b, a third portion 153c, and a fourth portion 153d in this order from the one side to the other side. The first portion 153a, the second portion 153b, the third portion 153c, and the fourth portion 153d are four columnar portions having different diameters.

An end portion at the one side of the first portion 153a is formed with a male screw which engages with a female screw formed at the opening and closing member 135.

A diameter of the second portion 153b is smaller than a diameter of a central hole 171a of a second support member 171, and the second portion 153b is inserted into the central hole 171a of the second support member 171.

A diameter of the third portion 153c is smaller than the diameter of the second portion 153b. A diameter of the fourth portion 153d is smaller than the diameter of the third portion 153c. An end portion at the other side of the third portion 153c is provided with a protruding portion 153e which protrudes from an outer circumferential surface across the entire circumference. The protruding portion 153e is provided with a seal ring 153f fitted into a groove recessed from the outer circumferential surface.

An end portion at the other side of the fourth portion 153d is formed into a hemispherical shape.

The first operation portion 155 includes a first base 156 fitted into the insertion hole 95a of the mounting member 95, and a first adjuster 157 which is rotationally operated from the outside. The first operation portion 155 which is an operation portion extending in the radial direction includes a first positioning member 158 which determines a position of the holding member 153 in the axial direction when the first positioning member 158 is moved in the cylinder 11 in the radial direction due to an operation of the first adjuster 157, and a pin 159 inserted into the first positioning member 158.

The first base 156 is a cylindrical member in which a central hole 156a is formed in a central portion of the first base 156. The first base 156 is formed with, at equal intervals in the circumferential direction, a plurality of communication holes 156b which allows the central hole 156a and an outer side of the first base 156 to communicate with each other. A portion inside the first base 156 is formed with a female screw 156c which engages with a male screw 158c formed at the first positioning member 158.

The first adjuster 157 is a columnar member and is inserted into the central hole 156a of the first base 156. The first adjuster 157 has a columnar portion 157a protruding into a columnar shape from an inner end portion to an outer side. The first adjuster 157 has a coil spring inserted into a recessed portion formed in the axial direction. The first adjuster 157 includes a fitting member 157b which is supported by the coil spring and is fitted into the communication hole 156b when the coil spring protrudes from an outer circumferential surface, for example, in a case where the coil spring has a free length. The first adjuster 157 is provided with a seal ring 157c which is fitted into a groove recessed from an outer circumferential surface of the first adjuster 157. The first adjuster 157 is formed with an operation groove 157d which is recessed from an outer end surface to an inner side.

The first positioning member 158 has a base portion 158a having a columnar shape and a tip end portion 158b having a truncated cone shape.

An outer circumferential surface of the base portion 158a is formed with the male screw 158c which engages with the female screw 156c formed at the first base 156. An outer end surface of the base portion 158a is formed with a groove 158d recessed inward in a columnar shape. The columnar portion 157a of the first adjuster 157 is fitted into the groove 158d.

The first positioning member 158 is formed with a hole 158e which passes through the base portion 158a and the tip end portion 158b in the radial direction. A pin 159 is inserted into the hole 158e.

[Second Adjustment Unit 160]

The second adjustment unit 160 includes a second spring 161 which is a coil spring applying a force in a closing direction to the second valve 132, a support member 162 which supports an end portion 161b at the other side of the second spring 161, and a second adjustment portion 170 which adjusts a position of the support member 162 in the axial direction.

The support member 162 is a member in which a central hole 162a is formed in a central portion of the support member 162. A diameter of the central hole 162a is larger than an outer diameter of the collar 182, and the support member 162 is disposed to surround the collar 182.

The support member 162 includes a support portion 162b which supports an end portion at the other side of the second spring 161, a receiving portion 162c which receives an axial force transmitted via the second support member 171 to be described later, and a connection portion 162d which connects the support portion 162b and the receiving portion 162c.

The support portion 162b is an annular portion. A surface at the one side of the support portion 162b is formed to such a shape in which an inner diameter of the surface is smaller than an inner diameter of the second spring 161 and an outer diameter of the surface is larger than an outer diameter of the second spring 161. The surface at the one side of the support portion 162b is in contact with the second spring 161.

The receiving portion 162c is an annular portion provided inward from the support portion 162b and provided at the one side. An outer diameter of a surface at the other side of the receiving portion 162c is equal to or larger than an outer diameter of the second support member 171.

The connection portion 162d is a cylindrical portion having an inner diameter and an outer diameter which gradually increase from the one side toward the other side. The connection portion 162d prevents a movement in the radial direction of the second spring 161 which is disposed to surround the connection portion 162d, and prevents a movement in the radial direction of the second support member 171 which is disposed inward of the connection portion 162d.

The second adjustment portion 170 includes the second support member 171 which transmits an axial force to the support member 162, and a plate-shaped member 172 which is disposed between the second support member 171 and the support member 162. The second adjustment portion 170 further includes a contact member 173 which is in contact with the second support member 171 and is a separate member from the second support member 171, and a second operation portion 175 which can change a position of the second support member 171 in the axial direction by a rotation operation, and thus can also change a position of the support member 162 in the axial direction.

The second support member 171 is an annular member in which the central hole 171a is formed in a central portion of the second support member 171. An outer diameter of the second support member 171 is larger than an outer diameter of the collar 182 and is equal to or smaller than an inner diameter at the other side of the connection portion 162d of the support member 162. As illustrated in FIG. 10, the second support member 171 communicates with the communication hole 293a of the piston rod 293.

The plate-shaped member 172 is an annular member in which a central hole 172a is formed in a central portion of the plate-shaped member 172. A diameter of the central hole 172a is larger than an outer diameter of the collar 182, and the plate-shaped member 172 is disposed to surround the collar 182. An outer diameter of the plate-shaped member 172 is equal to or smaller than an outer diameter of a surface at the other side of the receiving portion 162c of the support member 162. The plate-shaped member 172 is disposed inside the connection portion 162d of the support member 162.

The contact member 173 includes a first portion 173a, a second portion 173b, a third portion 173c, and a fourth portion 173d in this order from the one side to the other side. The first portion 153a, the second portion 153b, the third portion 153c, and the fourth portion 153d are four cylindrical portions located at different positions in the axial direction. The contact member 173 is disposed inside the piston rod 93 and is disposed to surround the holding member 153 of the first adjustment portion 150.

An inner diameter of the first portion 173a is larger than an outer diameter of the second portion 153b of the holding member 153, and a portion of the second portion 153b is inserted into the first portion 173a.

An inner diameter of the second portion 173b is larger than an outer diameter of the protruding portion 153e provided at the third portion 153c, and the third portion 153c, a part of the fourth portion 153d, and the protruding portion 153e are inserted into the second portion 173b. Then, the seal ring 153f fitted into the protruding portion 153e seals a gap between the contact member 173 and the holding member 153. The inner diameter of the second portion 173b is smaller than the outer diameter of the second portion 153b of the holding member 153, and the second portion 153b is prevented from moving to the other side.

An inner diameter of the third portion 173c is larger than an outer diameter of the fourth portion 153d, and the fourth portion 153d is inserted into the third portion 173c. The inner diameter of the third portion 173c is smaller than an outer diameter of the protruding portion 153e, and the protruding portion 153e is prevented from moving to the other side.

As illustrated in FIG. 9, an inner diameter of the fourth portion 173d is larger than an outer diameter of the fourth portion 153d, and the fourth portion 153d is inserted into the third portion 173c and the fourth portion 173d. A seal ring 173e is fitted into a groove which is recessed from an outer circumferential surface of the fourth portion 173d. The seal ring 173e seals a gap between the contact member 173 and an inner circumferential surface of the piston rod 93. A protruding portion 173f which protrudes to the other side is provided at an end portion at the other side of the fourth portion 173d at a portion close to a side where the second operation portion 175 is disposed. A tip end of the protruding portion 173f is chamfered to have a chamfered portion 173g so that a distance from a center line is gradually reduced from the one side to the other side.

The second operation portion 175 includes a second base 176 fitted into the insertion hole 95a of the mounting member 95, and a second adjuster 177 which is rotationally operated from the outside. The second operation portion 175 includes a second positioning member 178 which determines a position of the contact member 173 in the axial direction when the second positioning member 178 is moved in the radial direction due to an operation of the second adjuster 177. Similar to the first operation portion 155, the second operation portion 175 is an operation portion extending in the radial direction. The first operation portion 155 and the second operation portion 175 are coaxially disposed at opposite sides across a plane which passes through an axial center of the cylinder 11 and is parallel to the axial direction. With such an arrangement, the second damping force generating device 200 including the first adjustment unit 140 and the second adjustment unit 160 can be reduced in size.

The second base 176 is a cylindrical member in which a central hole 176a is formed in a central portion of the second base 176. The second base 176 is formed with, at equal intervals in the circumferential direction, a plurality of (for example, four) communication holes 176b which allows the central hole 176a and an outer side of the second base 176 to communicate with each other.

The second adjuster 177 is a columnar member and is inserted into the central hole 176a of the second base 176. The second adjuster 177 has a recessed portion 177a which is recessed outward from an inner end portion of the second adjuster 177. The pin 159 is fitted into the recessed portion 177a. The second adjuster 177 includes a fitting member 177b which is supported by a coil spring inserted into a recessed portion formed in the axial direction and which is fitted into the communication hole 176b when the second adjuster 177 protrudes from an outer circumferential surface, for example, in a case where the coil spring has a free length. The second adjuster 177 has a seal ring 177c which is fitted into a groove recessed from an outer circumferential surface of the second adjuster 177. The second adjuster 177 is formed with an operation groove 177d which is recessed from an outer end surface to an inner side. A tip end portion of the second adjuster 177 is formed with a male screw 177e which engages with a female screw 178a formed at the second positioning member 178.

The second positioning member 178 is a cylindrical member and is inserted into the insertion hole 95a of the mounting member 95. An inner circumferential surface of the second positioning member 178 is formed with the female screw 178a which engages with the male screw 177e of the second adjuster 177. A chamfered portion 178b is formed at an inner end portion of the second positioning member 178 at a portion facing the chamfered portion 173g of the fourth portion 173d.

[Function of First Adjustment Unit 140]

In the first adjustment unit 140, when the first adjuster 157 of the first operation portion 155 is rotationally operated from the outside of the mounting member 95, the first positioning member 158 into which the columnar portion 157a is fitted is rotated around the pin 159. Then, the male screw 158c formed at the first positioning member 158 is engaged with the female screw 156c formed at the first base 156, so that the first positioning member 158 moves in the radial direction. For example, in a case where the male screw 158c and the female screw 156c are right-handed screws, when the first adjuster 157 is rotated clockwise, the first positioning member 158 moves in a direction away from the fitting member 157b. Then, a position of an end portion at the other side of the fourth portion 153d of the holding member 153 moves to the other side along an outer circumferential surface of the tip end portion 158b of the first positioning member 158. As the holding member 153 moves to the other side in this manner, the opening and closing member 135 moves to the other side, and the plate-shaped portion 135a of the opening and closing member 135 moves in a direction of closing the opening portion of the communication passage 97a of the nut 97. On the other hand, when the first adjuster 157 is rotationally operated counterclockwise, as the first positioning member 158 moves in a direction of coming close to the fitting member 157b, the holding member 153 moves to the one side, and the plate-shaped portion 135a of the opening and closing member 135 moves in a direction of opening the opening portion of the communication passage 97a of the nut 97.

[Function of Second Adjustment Unit 160]

In the second adjustment unit 160, when the second adjuster 177 of the second operation portion 175 is rotationally operated from an outer side of the mounting member 95, the male screw 177e formed at the second adjuster 177 and the female screw 178a formed at the second positioning member 178 engage with each other, so that the second positioning member 178 moves in the radial direction. For example, in a case where the male screw 177e and the female screw 178a are left-handed screws, when the second adjuster 177 is rotated clockwise, the second positioning member 178 moves from an outer side to an inner side. Then, a position of the chamfered portion 173g of the contact member 173 moves to the one side along the chamfered portion 178b of the second positioning member 178. As the contact member 173 moves to the one side in this manner, the second support member 171 is pushed to the one side due to the movement of the contact member 173 to the one side, so that the second support member 171 moves to the one side and the support member 162 moves to the one side. As a result, a length of the second spring 161 is shortened, and a preset load F which is a preset load of the second spring 161 is increased. On the other hand, for example, in a case where the male screw 177e and the female screw 178a are left-handed screws, when the second adjuster 177 is rotated counterclockwise, as the second positioning member 178 moves from the inner side to the outer side, the contact member 173 and the second support member 171 move to the other side and the support member 162 moves to the other side. As a result, a length of the second spring 161 is increased, and the preset load F is reduced.

[Function of Second Damping Force Generating Device 200]

In a case where the opening and closing member 135 opens the opening portion of the communication passage 97a of the nut 97, even when the preset load F has a minimum value, the second valve 132 is set to open the second flow path 122 when the pressure Ps is higher than the first pressure P1. Therefore, a relationship between the speed Vp of the piston 92 and a damping force during a compression side stroke is as illustrated in FIG. 6. When the opening and closing member 135 closes the opening portion of the communication passage 97a of the nut 97, the relationship between the speed Vp of the piston 92 and the damping force during the compression side stroke is as illustrated in FIG. 7.

[Function of Shock Absorber 2]

In the shock absorber 2 having the above-described configuration, the pressure Ps at which the second valve 132 is opened can be adjusted by operating the second operation portion 175. Therefore, compared with the shock absorber 1, the second shock absorber 2 can more easily and independently adjust the damping force in the high speed range apart from the adjustment of damping forces in the low speed range and the medium speed range. Therefore, the shock absorber 2 can more easily adjust the damping force in the high speed range than the shock absorber 1.

Third Embodiment

Figure 11:
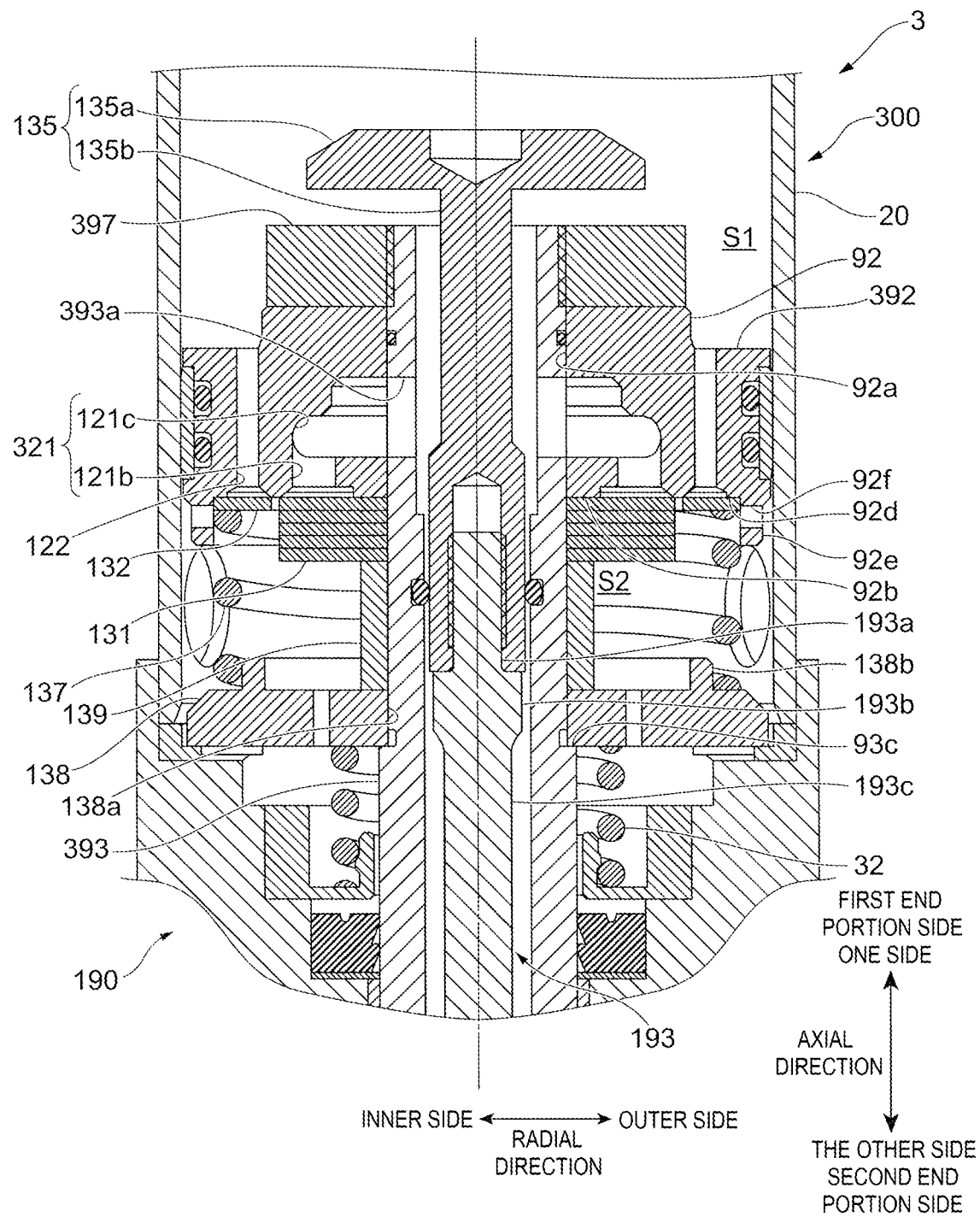
FIG. 11 is a diagram illustrating an example of a cross section of a shock absorber 3 according to a third embodiment.

FIG. 11 is a diagram illustrating an example of a cross section of a shock absorber 3 according to a third embodiment.

The shock absorber 3 is different from the shock absorber 1 in that the shock absorber 3 includes a second damping force generating device 300 instead of the second damping force generating device 100.

Hereinafter, differences of the second damping force generating device 300 from the second damping force generating device 100 will be described. Components having the same function in the second damping force generating device 300 and the second damping force generating device 100 are denoted by the same reference numerals, and detailed description thereof will be omitted.

The second damping force generation device 300 is different from the second damping force generation device 100 in a flow path from the oil chamber S1 to the first valve 131. That is, a piston 392 provided in the shock absorber 3 according to the third embodiment is different from the piston 92 in that the piston 392 does not include the first portion 121a. That is, a first flow path 321 provided in the shock absorber 3 according to the third embodiment includes the second portion 121b and the third portion 121c. A nut 397 according to the third embodiment is different from the nut 97 in that the nut 397 is not formed with the communication passage 97a. A piston rod 393 according to the third embodiment is different from the piston rod 93 in that a communication hole 393a which allows an inner side and an outer side of the piston rod 393 to communicate with each other is formed at a position corresponding to the third portion 121c of the piston 392 in the axial direction.

In the second damping force generating device 300 having the above-described configuration, when the plate-shaped portion 135a of the opening and closing member 135 is not in contact with an end surface at the one side of the nut 397, oil in the oil chamber S1 flows to the first valve 131 via a gap between the columnar portion 135b of the opening and closing member 135 and an inner circumferential surface of the piston rod 393, the communication hole 393a of the piston rod 393, the third portion 121c and the second portion 121b of the piston 392.

The second damping force generating device 300 having the above-described configuration can also obtain the same effects as the second damping force generating device 100.

The flow path from the oil chamber S1 to the first valve 131 in the second damping force generating device 200 may also have a configuration similar to that in the second damping force generating device 300.

The invention claimed is:

1. A shock absorber comprising:
a first damping force generating portion which is fixed to a first end portion of a cylinder in an axial direction thereof; and
a second damping force generating portion which is disposed to be movable in the axial direction in the cylinder,
wherein the cylinder includes an inner cylinder and an outer cylinder,
wherein an upper end portion of the inner cylinder and an upper end portion of the outer cylinder are inserted into and held in a damper case,
wherein one end of a first communication passage is formed to be opened in the damper case at a position facing an opening of the upper end portion of the inner cylinder, and the first communication passage allows a first oil chamber formed in the cylinder at a side closer to the first end portion thereof and a second oil chamber formed in the first damping force generating portion to communicate with each other,
wherein an opening portion and a second communication passage are formed in the damper case, the second communication passage being continuous with the opening portion, and allowing a third oil chamber formed in the first damping force generating portion and an annular flow path to communicate with each other, the third oil chamber being different from the second oil chamber, the annular flow path being a flow path between the inner cylinder and the outer cylinder,
wherein the second damping force generating portion includes:
a first flow path which passes through a piston in the axial direction, the piston partitioning a space inside the cylinder;
an opening and closing member which is disposed at an end portion at a first end portion of the first flow path, and opens and closes the first flow path;
an adjustment unit which adjusts a position of the opening and closing member in the axial direction;
a second flow path which is located at a different position from the first flow path and passes through the piston in the axial direction; and
a second valve which is disposed at an end portion of the second flow path at a side closer to a second end portion of the cylinder, and which opens and closes the second flow path, said second end portion being an end portion opposite to the first end portion in the axial direction,
wherein the first flow path is formed in a central portion in a radial direction of the piston and is formed at a position radially outside a central hole through which a piston rod passes,
wherein the second flow path is formed radially outside the cylinder from the first flow path,
wherein a nut, which determines a position of the piston by being fastened to the piston rod passing through an inner side of the piston, is provided at a side of the piston closer to the first end portion, wherein the nut is provided with a communication passage which allows the first flow path and the space in the cylinder to communicate with each other, wherein the opening and closing member includes:
  a plate-shaped portion which has a disk shape and is provided at a side closer to the first end portion; and
  a columnar portion which has a columnar shape and is provided at a side closer to the second end portion, wherein the plate-shaped portion of the opening and closing member opens an opening portion of the communication passage, so that the first flow path is opened, wherein the second damping force generation portion further includes a first valve which opens and closes an opening portion of the first flow path at a side closer to the second end portion, wherein the second valve opens the second flow path when a pressure of the first oil chamber is equal to or higher than a second predetermined pressure, the first oil chamber being defined by the piston in the cylinder, wherein the first valve opens the first flow path when a pressure of the first oil chamber is equal to or higher than a first predetermined pressure that is lower than the second predetermined pressure, and wherein the first damping force generating portion generates a damping force even when the pressure of the first oil chamber is lower than the first predetermined pressure.

2. The shock absorber according to claim 1,
wherein the second damping force generating portion further includes:
  a spring which applies a force in a closing direction to the second valve; and
  a support member which supports an end portion of the spring at a side closer to the second end portion.

3. The shock absorber according to claim 1,
wherein the second damping force generating portion further includes:
  a spring which applies a force in a closing direction to the second valve;
  a support member which supports an end portion of the spring at a side closer to the second end portion; and
  an adjustment portion which adjusts a position of the support member.

4. The shock absorber according to claim 1,
wherein the adjustment unit which can adjust a position of the opening and closing member to a position where the opening and closing member closes an opening portion of the communication passage when the opening and closing member comes into contact with a surface of the nut a side closer to the first end portion, and a position where the opening and closing member opens the opening portion of the communication passage when the opening and closing member is separated away from the surface of the nut.

5. The shock absorber according to claim 1,
wherein the first end portion of the cylinder is disposed at a vehicle body side, and wherein the piston rod holds the piston at an end portion of the piston rod closer to the first end portion, and wherein an end portion of the piston rod at a side closer to the second end portion is disposed at a wheel side.

6. A saddle-type vehicle comprising:
a vehicle body;
a front wheel disposed at a front side of the vehicle body in a traveling direction;
a rear wheel disposed at a rear side in the traveling direction;
a first shock absorber disposed between the vehicle body and the front wheel; and
a second shock absorber disposed between the vehicle body and the rear wheel,
wherein at least the second shock absorber is the shock absorber according to claim 1.

7. The shock absorber according to claim 2,
wherein the adjustment unit which can adjust a position of the opening and closing member to a position where the opening and closing member closes an opening portion of the communication passage when the opening and closing member comes into contact with a surface of the nut at a side closer to the first end portion, and a position where the opening and closing member opens the opening portion of the communication passage when the opening and closing member is separated away from the surface of the nut.

8. The shock absorber according to claim 3,
wherein the adjustment unit which can adjust a position of the opening and closing member to a position where the opening and closing member closes an opening portion of the communication passage when the opening and closing member comes into contact with a surface of the nut at a side closer to the first end portion, and a position where the opening and closing member opens the opening portion of the communication passage when the opening and closing member is separated away from the surface of the nut.

9. The shock absorber according to claim 2,
wherein the first end portion of the cylinder is disposed at a vehicle body side, and
wherein the piston rod holds the piston at an end portion of the piston rod closer to the first end portion, and
wherein another end portion of the piston rod closer to the second end portion is disposed at a wheel side.

10. The shock absorber according to claim 3,
wherein the first end portion of the cylinder is disposed at a vehicle body side, and
wherein the piston rod holds the piston at an end portion of the piston rod closer to the first end portion, and
wherein another end portion of the piston rod closer to the second end portion is disposed at a wheel side.

11. The shock absorber according to claim 1,
wherein the first valve opens the first flow path and the second valve closes the second flow path when the pressure of the first oil chamber is equal to or higher than the first predetermined pressure.

* * * * *